(12) United States Patent
Kano

(10) Patent No.: US 7,873,809 B2
(45) Date of Patent: Jan. 18, 2011

(54) METHOD AND APPARATUS FOR DE-DUPLICATION AFTER MIRROR OPERATION

(75) Inventor: Yoshiki Kano, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 811 days.

(21) Appl. No.: 11/727,946

(22) Filed: Mar. 29, 2007

(65) Prior Publication Data

US 2008/0244172 A1    Oct. 2, 2008

(51) Int. Cl.
*G06F 12/00* (2006.01)

(52) U.S. Cl. .................. 711/216; 711/114; 711/162; 711/165; 711/170; 711/E12.002

(58) Field of Classification Search ............... None
See application file for complete search history.

(56) References Cited

U.S. PATENT DOCUMENTS

| 6,836,819 | B2 | 12/2004 | Kano et al. |
| 7,065,619 | B1 | 6/2006 | Zhu et al. |
| 2002/0143903 | A1 | 10/2002 | Uratani et al. |
| 2002/0169934 | A1* | 11/2002 | Krapp et al. ............... 711/159 |
| 2005/0182888 | A1* | 8/2005 | Murotani et al. ............ 711/1 |

OTHER PUBLICATIONS

"Single Instance Storage in Microsoft Windows Storage Server 2003 R2—A Solution for Managing Duplicate Files", Technical White Paper, Microsoft Corp., May 2006, pp. 1-17.

* cited by examiner

*Primary Examiner*—Shawn X Gu
(74) *Attorney, Agent, or Firm*—Mattingly & Malur, P.C.

(57) ABSTRACT

An amount of storage capacity used during mirroring operations is reduced by applying de-duplication operations to the mirror volumes. Data stored to a first volume is mirrored to a second volume. The second volume is a virtual volume having a plurality of logical addresses, such that segments of physical storage capacity are allocated for a specified logical address as needed when data is stored to the specified logical address. A de-duplication operation is carried out on the second volume following a split from the first volume. A particular segment of the second volume is identified as having data that is the same as another segment in the second volume or in the same consistency group. A link is created from the particular segment to the other segment and the particular segment is released from the second volume so that physical storage capacity required for the second volume is reduced.

20 Claims, 32 Drawing Sheets

Volume Configuration Management Table 100

| Parity Group 101 | Size 102 | RAID 103 | Disk # 104 | VOL 105 | Start LBA 106 | End LBA 107 | Size 108 |
|---|---|---|---|---|---|---|---|
| 1 | 100TB | RAID5 | 1,2,3,4 | 1 | 0 | 1073741823 | 512GB |
|   |       |       |         | 2 | 1073741824 | 2147483647 | 512GB |
|   |       |       |         | ... | ... | ... |  |
| 2 | 200TB | RAID1 | 10,11,12,13 | 10 | 0 | 2147483647 | 1TB |
| 3 | 1TB | RAID1 | ... | ... | ... | ... |  |
| 4 | 2TB | ... | ... | ... |  |  |  |
| ... | ... | ... | ... | ... |  |  |  |

FIG. 5

Volume-Port Mapping Table 110

| Port 111 | WWN 112 | LUN 113 | VOL 114 | CMD DEV 115 | Access Mode 116 | Dest. 117 |
|---|---|---|---|---|---|---|
| 1 | 10.00.00.00.C9.36.07.D7 | 1 | VOL1 | | R/W | |
| 1 | 10.00.00.00.C9.36.07.D7 | 2 | VOL2 | x | | |
| 1 | 10.00.00.00.C9.36.07.D7 | 3 | VOL3 | | | |
| ... | ... | ... | ... | | | |
| 2 | 10.00.00.00.C9.36.07.01 | - | - | | | 51242 |
| 2 | 10.00.00.00.C9.36.07.01 | - | - | | | 51242 |
| ... | ... | ... | ... | | | |
| 3 | 10.00.00.00.C9.36.07.02 | - | - | | R/O | 50121 |
| 3 | 10.00.00.00.C9.36.07.02 | - | - | | R/O | 50121 |
| ... | ... | ... | ... | | | |
| 4 | 10.00.00.00.C9.36.07.03 | 1 | VOL101 | | | |
| 4 | 10.00.00.00.C9.36.07.03 | 2 | VOL102 | | | |
| ... | ... | ... | ... | | | |

FIG. 6

Free Segment Pool 130

| SEGMENT | VOL | LBA | Size |
|---|---|---|---|
| 301 | 200 | 22517 | 2048 |
| 302 | 200 | 24564 | 2048 |
| ... | .. | ... | .. |

Mirror Manager Pair Table 140

| Pair No. 141 | C.G. No. 142 | Primary 143 | | | | Secondary 146 | | | | Status of De-duplication 135 | De-Dupl. Flag 137 |
|---|---|---|---|---|---|---|---|---|---|---|---|
| | | Serial 144 | Port | LU 145 | VOL | Serial 147 | Port 148 | LU | VOL 149 | 136 | |
| 1 | 1 | 50121 | 1 | 1 | 1 | 51241 | 2 | 1 | 1001 | Processed | Yes |
| 2 | | 50121 | 1 | 2 | 2 | 51241 | 2 | 2 | 1002 | Processing | |
| 3 | | 50121 | 1 | 3 | 3 | 51241 | 2 | 3 | 1003 | Un-processed | |
| ... | ... | ... | ... | ... | ... | ... | ... | ... | ... | ... | ... |
| 10 | 2 | 50121 | 2 | 3 | 100 | 51241 | 2 | 3 | 1100 | Un-processed | No |
| ... | ... | ... | ... | ... | ... | ... | ... | ... | ... | ... | ... |

FIG. 9A

Mirror Manager Pair Table 140

| Pair No. 141 | C.G. No. 142 | Primary 143 | | | | Secondary 146 | | | | Status of De-duplication 136 | De-Dupl. Flag 137 |
|---|---|---|---|---|---|---|---|---|---|---|---|
| | | Serial 144 | Port | LU | VOL 145 | Serial 147 | Port 148 | LU | VOL 149 | 135 | |
| 1 | 1 | 50121 | 1 | 1 | 1 | 51242 | 2 | 1 | 1001 | Processed | Yes |
| 2 | | 50121 | 1 | 2 | 2 | 51242 | 2 | 2 | 1002 | Processing | |
| 3 | | 50121 | 1 | 3 | 3 | 51242 | 2 | 3 | 1003 | Un-processed | |
| ... | ... | ... | ... | ... | ... | ... | ... | ... | ... | ... | ... |
| 10 | 2 | 50121 | 2 | 3 | 100 | 51242 | 2 | 3 | 1100 | Un-processed | No |
| ... | ... | ... | ... | ... | ... | ... | ... | ... | ... | ... | ... |

FIG. 9B

Bitmap Table

| Segment Size | Current Copying Point | Segment No. | Flag | Status |
|---|---|---|---|---|
| 1MB |  | 1 | On | Writing |
|  |  | 2 | Off | Normal |
|  | X | 3 | On | Copying |
|  |  | ... | ... | ... |
|  |  | ... | ... | ... |

Virtualization Apparatus Physical Configuration

External Volume Mapping Table

| Ex-VOL | Size | WWN | LUN |
|---|---|---|---|
| 1 | 500GB | 10.00.00.00.C9.36.07.32 | 1 |
| 2 | 500GB | 10.00.00.00.C9.36.07.32 | 2 |
| 3 | 1TB | 10.00.00.00.C9.36.07.DF | 1 |
| ... |  | ... | ... |

FIG. 19

File System Virtual Volume Table 323

| Dev Name | Sgmt Size | File system | filename | Block Addr. | Sgmt No. | Identifier | Link Status |
|---|---|---|---|---|---|---|---|
| c0t0d1 | 2KB | /fs1 | /fs1/1.txt | 0 | 1 | 1f6d6637c06ebb2f8c354533ec17a48dea3d9808 | - |
| | | | | 4 | - | - | - |
| | | | | 8 | 1 | 1f6d6637c06ebb2f8c354533ec17a48dea3d9808 | Yes |
| | | | | ... | ... | ... | ... |
| | | | /fs1/2.txt | 0 | 3 | a88d359a25a117bfdfffe9def486761070885e3c | - |
| | | | | 4 | 1 | 1f6d6637c06ebb2f8c354533ec17a48dea3d9808 | Yes |
| | | | | 8 | 1 | 1f6d6637c06ebb2f8c354533ec17a48dea3d9808 | Yes |
| ... | ... | ... | ... | ... | ... | ... | ... |

FIG. 21

Export Table

322

| FS | Mode | ... |
|---|---|---|
| /fs1 | R/W | |
| /fs2 | | |
| ... | | |
| ... | R/O | ... |
| ... | | |

Mirror Manager Pair Table 370

| Pair No. | C.G. No. | Primary | | Secondary | | Status of De-duplication | De-Dupl. Flag |
| --- | --- | --- | --- | --- | --- | --- | --- |
| | | NAS Serial No. | FS | NAS Serial No. | FS | | |
| 1 | 1 | 50121 | fs1 | 50121 | fs11 | Processed | Yes |
| 2 | | 50121 | fs2 | 50121 | fs12 | Processing | |
| 3 | | 50121 | fs3 | 50121 | fs3 | Un-processed | |
| ... | ... | ... | ... | ... | ... | ... | ... |
| 10 | 2 | 50121 | 2 | 50121 | 2 | Un-processed | No |
| ... | ... | ... | ... | ... | ... | ... | ... |

FIG. 23

Bitmap Table  380

| File Name | Segment Size | Current Copying Point | Segment No. | Flag | Status |
|---|---|---|---|---|---|
| /fs1/1.txt | 2 KB | | 1 | On | Writing |
| | | | 2 | Off | Normal |
| | | X | 3 | On | Copying |
| | | | ... | ... | ... |
| | | | ... | ... | ... |

METHOD AND APPARATUS FOR DE-DUPLICATION AFTER MIRROR OPERATION

BACKGROUND OF THE INVENTION

1. Field of the Invention

The present invention relates generally to mirroring technology in storage systems.

2. Description of Related Art

Volume mirroring is the replication of a first (primary) logical volume to a separate mirror (secondary) logical volume. As updates are made to the primary volume, the updates are also made (mirrored) to the mirror volume. Thus, the mirror volume is a complete and separate copy of the primary volume. Volume mirroring technology may be used to enable recovery of data upon the occurrence of data loss in the primary volume. Depending on the technologies used and the desired level of data protection, mirroring can be performed synchronously, asynchronously, semi-synchronously, or point-in-time, and the mirror volume may be a local volume in the same storage system as the primary volume, or may be a remote volume located in a separate or remote storage system.

Current volume mirroring technology requires that the mirror volume have a size equal to or greater than the size of the primary volume being mirrored, regardless of the actual data content on the primary volume. However, in many cases a primary volume may contain a large amount of duplicated or redundant data, such as backups of files, different versions of files, and the like, that are related to original files also stored on the primary volume. Accordingly, it would be advantageous to reduce the amount of redundant or secondary data created or copied by mirroring technology, and thereby reduce the size of the mirror volumes and the overall storage capacity required to accommodate mirroring operations.

U.S. Pat. No. 7,065,619, to Zhu et al., filed Dec. 20, 2002, the disclosure of which is incorporated herein by reference, is directed to a data storage system that determines whether a data segment has been stored previously using a summary stored in a low latency memory. However, the prior art is not able to be applied to de-duplication of data in a mirror volume that forms part of mirrored pair with a primary volume which has exactly the same volume size on physical disk.

BRIEF SUMMARY OF THE INVENTION

The invention includes methods and apparatuses to enable the application of de-duplication technology to mirror volumes. The de-duplication technology reduces the duplicated data on a set of a consistency group, and accesses de-duplicated data using identifiers instead of the data. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 5 illustrates a volume configuration management table.

FIG. 6 illustrates a volume-port mapping table for mapping between ports, logical units and volume numbers.

FIG. 8 illustrates a free segment pool.

FIGS. 9A-9B illustrate a mirror manager pair table to store mirror information.

FIG. 19 illustrates an external volume mapping table.

FIG. 21 illustrates a file system virtual volume table.

FIG. 22 illustrates an export table.

FIG. 23 illustrates a mirror manager pair table to store mirror information.

FIG. 24 illustrates a bitmap table for use with file systems.

DETAILED DESCRIPTION OF THE INVENTION

Figure 1:
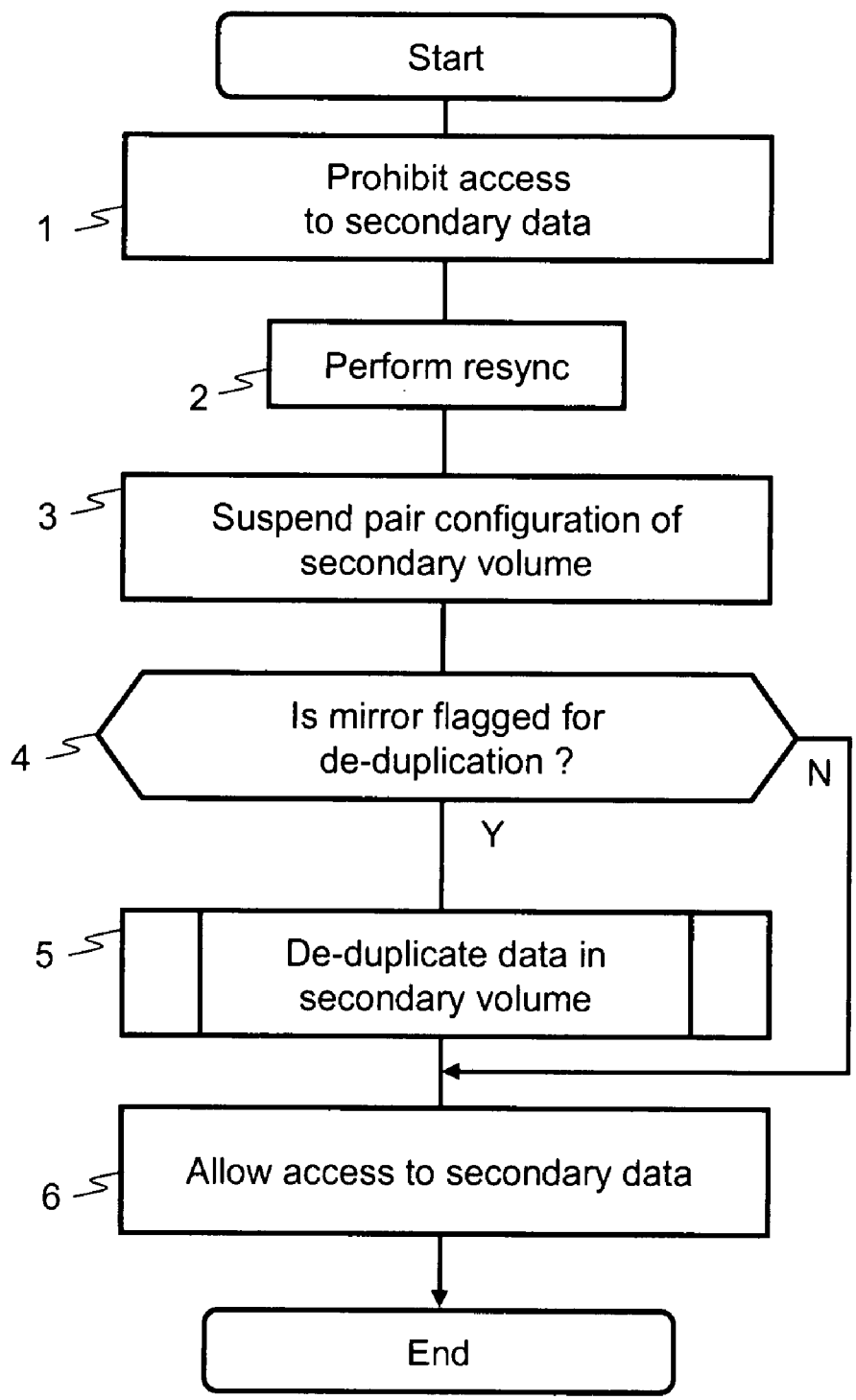
FIG. 1 illustrates a process for a resynchronizing, split and de-duplication operation according to the invention.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

Embodiments of the invention relate to mirroring technology and reducing the amount of redundant data stored using mirroring technology. Embodiments of the invention use a de-duplicating operation for secondary data after split of mirror. Embodiments of the invention include a mirror manager that will be discussed further below, and that is operational for carrying out the mirroring and de-duplication operations of the invention. FIG. 1 illustrates an exemplary process of the invention carried out by the mirror manager during a resynchronize, split and de-duplication operation under the invention. The process includes Steps 1-6, which are described below.

Step 1: The mirror manager prohibits to access to the secondary volumes. Prior to step 1, in some implementations, host computers are able to access secondary volumes as data volumes. Thus, step 1 changes the accessibility of the secondary volume and sets the access status of the secondary volume to either read-only status or an all-access-denied status.

Step 2: Mirror manager conducts a resynchronization of data from the primary volume to the secondary volume to ensure that the secondary volume is fully synchronized with the primary volume, i.e., that the data in the secondary volume matches the data contained in the primary volume.

Step 3: Mirror manager suspends the pair configuration following completion of the resynchronizing operation. This is also referred to as a "split" operation, i.e., updates that are made to the data in the primary volume are no longer copied to the secondary volume.

Step 4: Mirror manager checks whether the secondary volume has been designated for de-duplication operations. If the primary and secondary volumes are part of a consistency group, then this determination is made by checking whether the consistency group has been flagged for de-duplication. If the flag has been set that indicates that the volume has been designated for de-duplication, the procedure goes to Step 5. On the other hand, if the flag has not been set for de-duplication, then the procedure skips to Step 6.

Step 5: Mirror manager de-duplicates data on volumes under the consistency group. The particulars of the de-duplication operations and the architectures and data structures required for carrying the operations out are set forth in greater detail in the exemplary embodiments below.

Step 6: Mirror manager may change the access setting for the secondary volume back to enabled access for accepting all 10 operations. Alternatively, of course, the access setting may remain read-only if the secondary volume is intended only for archiving. Step 1 and Step 6 may be skipped if the mirror manager copies data online from the primary volume (P-VOL). For example, using what is referred to as "QuickSplit" capability, a user can refer to the secondary volume (S-VOL) after a split operation. Thus, under QuickSplit capability, the user can see S-VOL after a split even if there is no synchronization between P-VOL and S-VOL. Internally, in the case of QuickSplit capability, on a write operation for S-VOL, the mirror manager modifies the data for the write and stores the data on S-VOL. Additionally, for a read operation for S-VOL where the requested data has not been synchronized from P-VOL, the mirror manager reads the data from P-VOL, returns the requested data to the host, and then also stores the read data on S-VOL. This is an alternative online solution that may be used instead of offline steps 1-6 discussed above. Further, the process set forth above may be otherwise modified for various implementations of the invention, several examples of which are described below in the detailed embodiments.

Additionally, when a user wants to restore data contained on a de-duplicated secondary volume, such as when data in a primary volume is lost or corrupted, a process of the invention set forth in FIG. 2 including steps 11-15 may be carried out, as described below.

Step 11: Mirror manager changes the access settings for an identified secondary volume from which data is desired to be restored so as to prohibit external access to the identified secondary volume.

Step 12: Mirror manager checks the de-duplication flag of the identified secondary volume to determine whether the secondary volume was the subject of the de-duplication process of the invention. If the flag shows that de-duplication was performed, the procedure goes to Step 13. On the other hand, if the flag shows that de-duplication was not performed, the procedure skips to Step 14.

Step 13: Mirror manager resynchronizes data from a virtual secondary volume (V-VOL) which has been previously de-duplicated to the corresponding primary volume (details of the procedure are discussed below).

Step 14: Mirror manager resynchronizes data from a normal secondary volume to the corresponding primary volume.

Step 15: Mirror manager again allows access to the secondary volume for accepting all I/O operations, and the procedure ends.

The description of the invention includes eight exemplary embodiments as examples of the invention that implement the above-described operations. Thus, the described embodiments de-duplicate secondary data following a resynchronize and split operation under a mirroring configuration, and reduce the size of the secondary volumes, thereby saving overall storage space devoted to mirroring operations.

Embodiment 1

Local Mirror Using Storage Area Network

Figure 3:
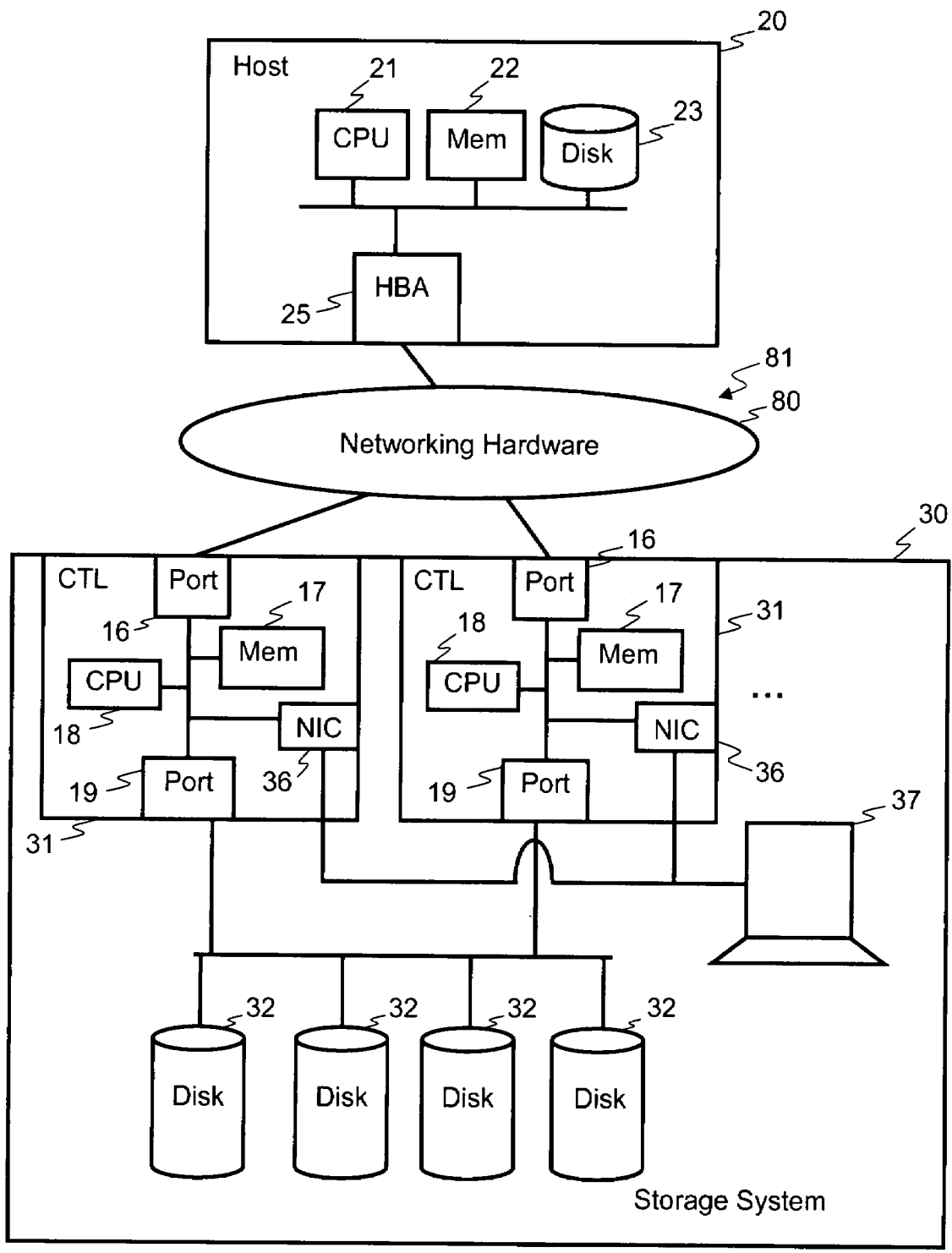
FIG. 3 illustrates an exemplary hardware architecture in which the invention may be practiced.

FIG. 3 illustrates exemplary hardware architecture and interconnections among the various components of an information system in which the first embodiment of the invention may be implemented. The architecture of the information system of this embodiment includes at least one host computer 20 and at least one storage system 30 able to communicate via a storage area network (SAN) 81 created by networking hardware 80.

Host computer 20 may include a hardware configuration such as that for a conventional workstation or personal computer. Thus, host computer 20 may include a CPU 21, a memory 22, and an internal hard disk drive 23. Host computer 20 may also include a host bus adapter (HBA) 24 to enable connection to Fibre Channel (FC) components, Ethernet components, or other type of networking components that form part of networking hardware 80. Each host computer 20 stores data on one or more logical units (LUs) (i.e., logical volumes) provided by storage system 30.

Storage system 30 includes one or more controllers 31 for controlling data access to and from a plurality of storage devices 32. Storage devices 32 are preferably hard disk drives, but in some embodiments may be other types of mass storage devices that provide physical storage space for storage of large amounts of data. Controller 31 includes a CPU 18, a memory 17, and a network interface card (NIC) 36 for connection to a management computer 37. Controller 31 may also include at least one front end port 16, such as a Fibre Channel port, for communicating with host computer 20 via SAN 81, and may also include at least one back end port 19 for connection to disks 32, such as via a Fibre Channel connection, SCSI (Small Computer System Interface) or the like. Controller 31 preferably includes a non-volatile random access memory (NVRAM) as at least a portion of memory 17, and can store data to the NVRAM for data caching purposes so that the data is protected, such as from a power failure. Port 16 and/or port 19 may have WWNs (World Wide Names) for specifying a target ID under SCSI protocol from a host, such as by specifying a LUN on a FC port. In some embodiments, controller 31 may be a RAID controller for configuring and operating on disks 32 in a RAID configuration, and may use SCSI-2, SCSI-3 or other protocol commands to store data on disks 32.

The storage system 30 may include a management computer 37 which is connected to the storage system for carrying out management functions. The management computer 37 may be a general web-based PC or workstation locally connected directly to storage system 30 via an Ethernet connection, or the like. Alternatively, management computer 37 may be located remotely from storage system 30 and an able to access storage system 30 via a generic IP protocol such as through a LAN or WAN.

Logical Configuration

Figure 4:
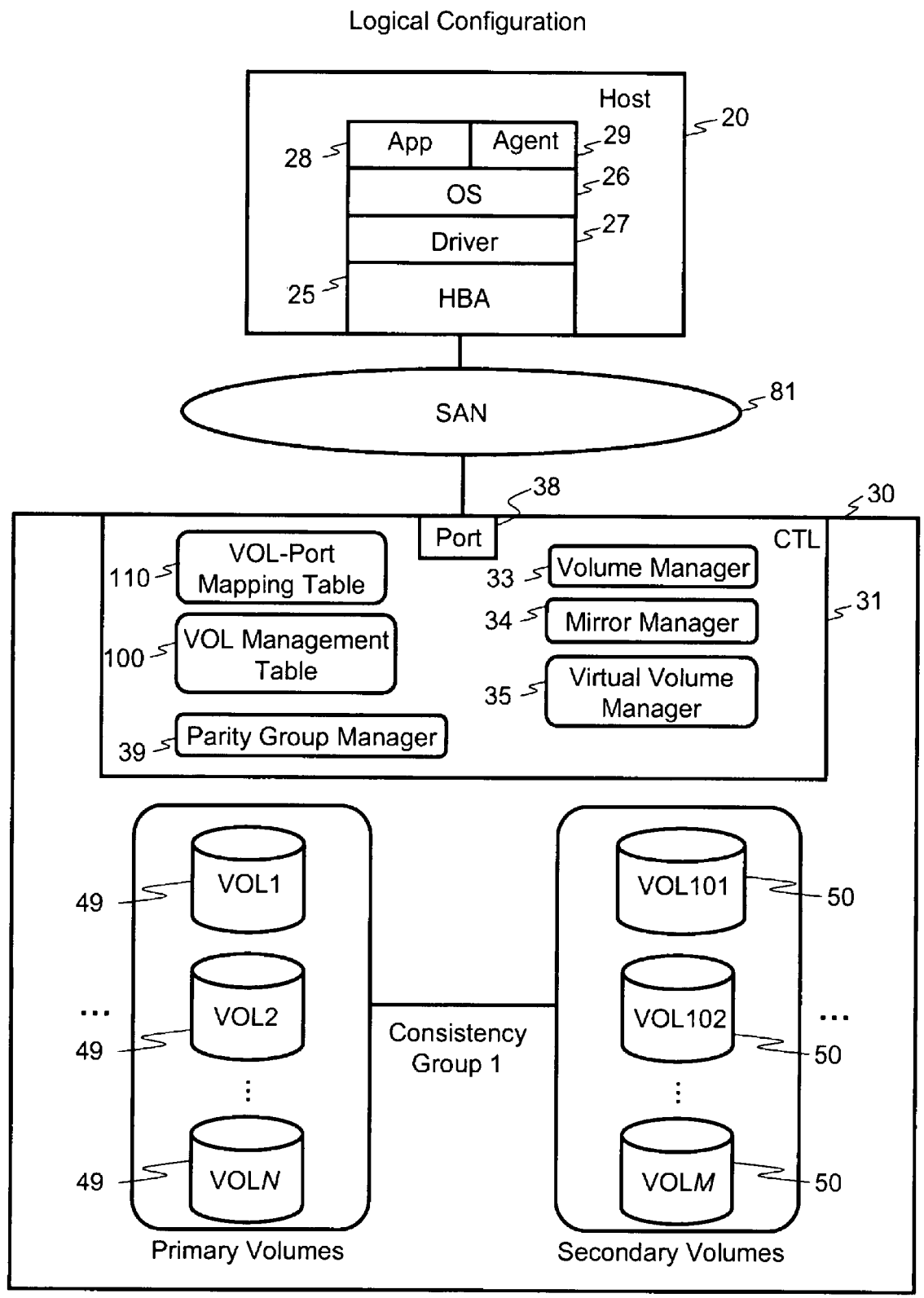
FIG. 4 illustrates an exemplary logical configuration of the architecture of FIG. 3.

FIG. 4 illustrates a logical configuration of the embodiment of FIG. 3, including illustration of software components and interconnections. SAN 81 provides a block access capable logical network connection, such SCSI, FC-SCSI, ESCON or other type of access protocol. In the embodiment described, FC-SCSI will be used to explain the embodiment. SAN 81 provides a logical connection between host computer 20 and storage system 30 via one or more logical ports 38 which may be created by a host storage domain that is based on host groups created using host WWNs. A number of logical ports 38 may be provided via one or more physical ports 16. SAN 81 may be provided by one or more of Fibre Channel switches, FC network hubs, Ethernet Switches, Ethernet hubs, or other types of networking devices (not shown), as is known in the art.

Host computer 20 may include an operating system (OS) 26, one or more applications (App) 28, and a SCSI driver 27 or other appropriate type of driver to enable host computer 20 to access one or more LUs on storage system 30. OS 26 may be UNIX, Microsoft Windows, Solaris, Z/OS, AIX, or other OS. Application 28 may be a transaction type application such as a database, an office application, or other kind of application that stores data to and retrieves data from one or more LUs on storage system 30. To assist in coordinating and controlling the mirroring operations, host computer 20 may have a storage control agent 29 as an in-band control mechanism able to communicate with storage system 30.

A technology which controls the storage devices using SCSI command sets may be used for the communication method with storage system 30. Such technology is described in US Patent Application Publication No. 2002/0143903, to Uratani et al., filed Feb. 26, 2002, the disclosure of which is incorporated herein by reference in its entirety. Accordingly, storage system 30 may implement one or more command devices, and agent 29 may be equal to the operation API (RMLIB) in US2002/0143903, and the one or more command devices may be functionally equal to command devices (CMs) in US Pat. Appl. Pub. No. 2002/0143903. Agent 29 is able to provide an application program interface (API) or a command line interface (CLI) for use in providing instructions for coupling operations to LUs in the storage system 30.

Storage system 30 includes one or more modules for carrying out the invention. The modules of storage system 30 may be enabled in microcode which is executed on the controller (CTL) 31 and may be provided as a program code installed from optical media, floppy disk, or other computer readable medium. In the illustrated embodiment, the modules include a parity group manager 39 for creating and managing parity groups, a volume manager 33 for creating and managing one or more volumes for providing the volumes to the host computer 20, a virtual volume manager 35, a mirror manager 34, a volume configuration management table 100 and a volume-port mapping table 110. Each of these modules or tables is described further below.

Parity group manager module 39 may be a portion of the microcode for controlling controller 31, and controls the creation and management of one or more parity groups, when appropriate, from disks 32 using RAID technology. For example, RAID 1 provides for a mirror disk, RAID 3 and RAID 4 provide for a dedicated parity disk, a RAID 5 parity group typically includes distributed storage of parity data, while RAID 6, based on RAID 5 technology, provides dual parity protection. Parity group manager module creates a RAID parity group, and the parity group is listed in a volume-parity group mapping table 100, as illustrated in FIG. 5. As will be discussed below, one or more volumes may be created on each parity group. Volume configuration management table 100 includes a parity group number 101 for identifying the parity group within storage system 30, a usable capacity size 102 created from disks 32 according to a specified RAID technology, the RAID configuration 103, and the identifiers 104 of the disks 32 that make up the parity group.

Volume manager 33 manages the structure of each logical volume (LU) and the behavior of the volume for I/O operations. The volume is created from at least a portion of a parity group and represents logical block addresses (LBAs) that correspond to physical storage areas on the disks 32 that make up the parity group. Thus, a host computer 20 is able to save data to a LBA in a volume, and the data is stored to a corresponding physical area in one or more of disks 32 that make up the parity group. A storage administrator may define and initially format the volume, and may designate a volume number for the volume. The mapping between volume and parity group is stored in volume-parity group mapping table 100, as illustrated in FIG. 5. Thus, volume-parity group mapping table 100 includes a volume number 105 to identify the logical volume within a parity group 101 within the storage system 30, a start Logical Block Address (LBA) 106 to represent a particular volume's start address on the parity group, an end LBA 107 to represent the last LBA in the particular volume, and a size 108 of the particular VOL. As discussed above, the start LBA 106 and end LBA 107 may be corresponded to physical addresses of physical storage areas in the parity group.

The logical volume is presented to the host computer 20 by storage system 30 as an area for storage of data. Host 20 may store data to a volume by designating a WWN, a logical unit number (LUN) and a start LBA in a write command through SAN 81. Thus, each volume may be assigned a LUN by which a host may identify that volume. FIG. 6 illustrates a mapping table 110 showing the mapping between ports, LUNs and volumes. Each value in the port number column 111 corresponds to one of the ports 16. Each port 16 has its own WWN 112 to be specified from the host computer 12. A plurality of volumes and corresponding LUNs can be assigned on each port 16. Thus, a volume is able to be specified by the host computer using a set of the WWN 112 and the LUN 113. The maximum number of LUs that may be assigned to a port based on Fibre Channel protocol (FCP) specifications is indicated by 8 bytes. Further, based on the mapping information of LUN 113 to volume 114 in volume-port mapping table 110, the controller 31 receives SCSI commands from the port and converts the set of WWN 112 and LUN 113 into the volume 114 when receiving an access command, so that the appropriate volume to access is determined.

Also a command device entry 115 may be included to indicate if a command device controls entry by the host computer 20 to the storage system 30 in a manner similar to that disclosed in the above-discussed US2002/0143903. A function of the command device is to control copy capability from an agent 29 on a host 20. In FIG. 6, an "X" in the command device column 115 indicates that LUN 2 (VOL2) is configured to act as a command device. The command device may be a separate LU, but does not need to be. For example, each LU (volume) may include the capabilities of a command device for controlling storage system 30. For convenience, a command device may be used within a consistency group of the invention; however, a command device may also be created without a consistency group. Further, each LUN on a port has a state of access mode 116. This access mode defines how a host computer is able access on volume data. The mode for volumes consists of following modes: "R/W" which provides read/write access; "R/O" which provides read only access; and "DENY" which denies any access. Thus, for example, if a write operation is received for a volume whose mode is "R/O", the port module of the storage system microcode returns an error to the host computer that sent the write command. Similarly, if "DENY" is the mode status, the port returns an error for all operations attempted by a host computer for that volume.

Mirror Manager 34 controls mirror operations for the storage system 30. Typical mirror operations include "create pair", "resync", "reverse resync", and "delete pair". Each of these operations will be discussed further below.

Virtual volume manager 35 manages "allocation-on-use volumes" that may be present in the storage system 30. In allocation-on-use technology, a volume does not have physical storage area (segment) from the parity group assigned to the volume until a write operation occurs that requires that a physical storage area be assigned to a particular portion of the volume. For such volume, if a read operation is received that is directed to a LBA of the allocation-on-use volume that does not yet have a physical storage segment assigned, then virtual volume manager 35 returns a series of zeros, or other system-defined or user-defined null value. On the other hand, when a physical storage segment has already been assigned to the LBA, the virtual volume manager 35 returns the data stored in the allocated segment. One example of allocation-on-use technology is described in U.S. Pat. No. 6,836,819, entitled "Automated On-Line Capacity Expansion Method for Storage Device", to Kano et al., filed Feb. 23, 2004, the disclosure of which is incorporated by reference herein in its entirety.

Figure 7:
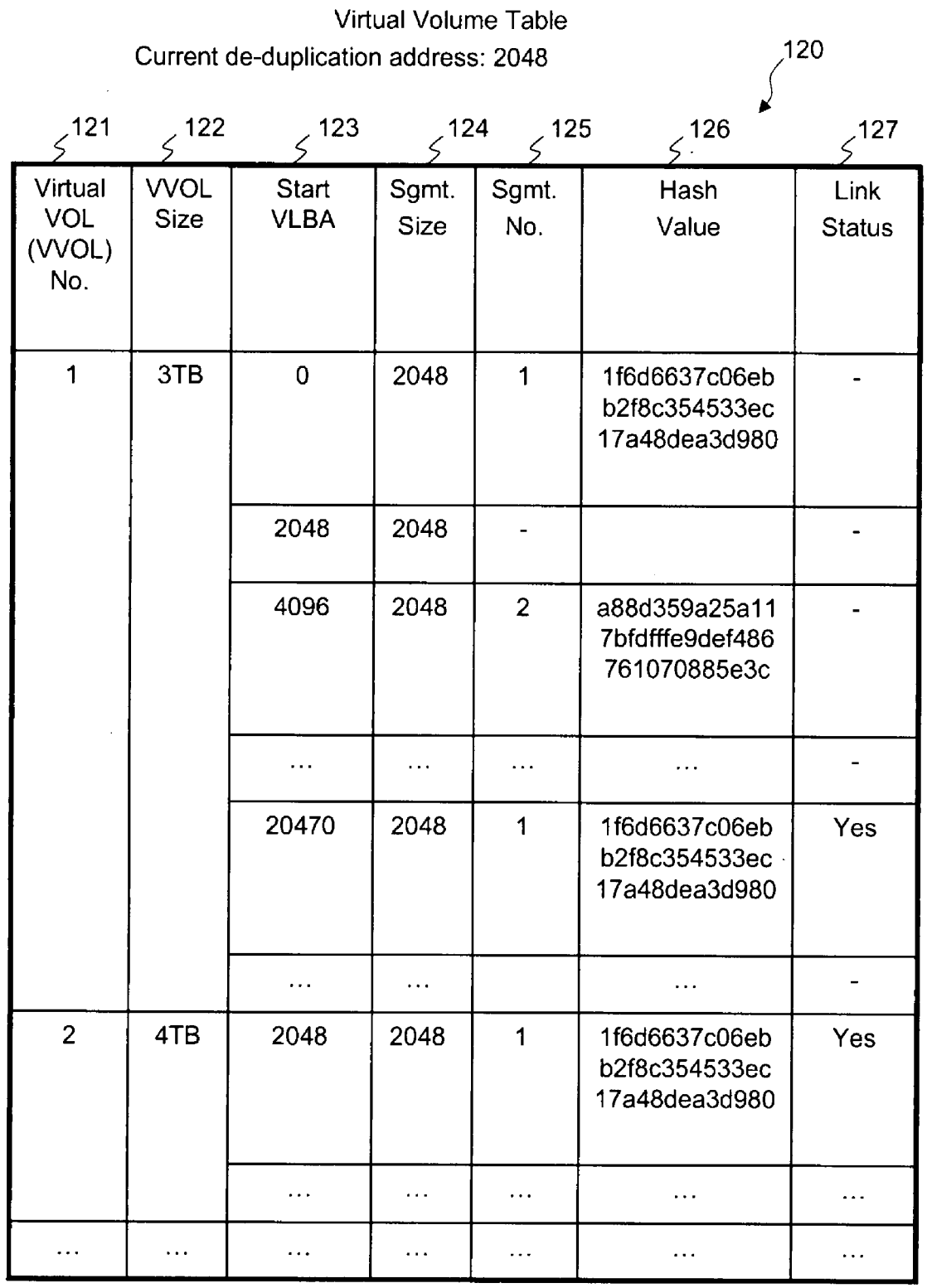
FIG. 7 illustrates a virtual volume table that includes address spaces for each virtual volume.

As example of an allocation-on-use-operation, FIG. 7 illustrates a virtual volume table 120 of address spaces for each virtual volume. The table consists of a virtual volume (VVOL) number 121 to identify the virtual volume within the storage system, a size of the virtual volume 122 which a host can retrieve using a SCSI READ Capacity command, a start virtual logical block address (VLBA) 123 to represent a start address space divided by each segment on virtual volume, a size 124 for each segment, and a segment number 125 for each segment. As additional information for allocation-on-use technology, the virtual volume table 120 includes a hash information 126 to indicate the uniqueness of data in a particular segment, and a link status 127 to indicate if the segment is linked, i.e., (YES) or not (—). Mirror manager 34 uses this information in a de-duplication operation carried out under the invention during a split operation, as will be discussed further below. Regarding VVOL number 121, volume-port mapping table 110 of FIG. 6 uses a "VVOL" number prefix, such as adding "100" or "1000" to the primary volume number, to identify a virtual volume on 114 in volume-port mapping table 110 in order to map the virtual volume to a port.

Regarding the segments that are allocated to the virtual volume, there is a pool of free segments from which segments are allocated. FIG. 8 illustrates a free segment pool 130. Storage administrator or virtual volume manager 35 allocates one or more volumes which are specified by volume number to free segment pool 130. Virtual volume manager 35 divides the volumes by a segment size which the system or administrator has predefined, and puts the segments into the segment pool. The free segment pool 130 consists of a segment number 131 to identify the segment using a unique identifier within the storage system 30, volume number 132, and start LBA 133 for the segment and size of segment 134.

Operations—Overview

Initially the storage system is set up to have one or more primary volumes allocated for use by a host computer. After preparing the primary volumes, a mirror pair is created for each primary volume. At some point, the mirror volume is subjected to a resync and split with de-duplication operation. Moreover, the split volume may be restored to act as a primary volume or other volume. Each of these processes is described in additional detail below.

Initial Setup

The administrator creates or initiates the creation of one or more primary volumes 49 and the command device volume (in this example, "VOL2" has been designated to act as the command device, as discussed above) from one or more parity groups in storage system 30. The administrator or a mirroring program then chooses and creates a secondary volume 50 for forming a mirror pair with each of the primary volumes 49. Secondary volumes 50 may be allocation-on-use virtual volumes, as discussed above. The administrator creates a path from the primary volume 49 to host computer 20 using volume-port mapping table 110. Multiple mirror pairs may be grouped together into a consistency group, as illustrated in FIG. 4. In a consistency group the multiple replication pairs are grouped together to ensure write order consistency from host I/O across all the primary volumes in the group. An administrator sets up the agent 29 on host computer 20 to communicate with the command device. In this invention, primary volume(s) 49 and the command device volume are logical volumes for which physical storage capacity is allocated at the time the volume is created. However, allocation-on-use virtual volumes may also be used for primary volume(s) 49 and a separate command device volume in some implementations of the invention.

Pair Creation

Using a command line interface or other means, an administrator is able to create a consistency group and replication (mirroring) pairs between primary volumes 49 and secondary volumes 50. At this time, the administrator turns a "de-duplication option" on for the consistency group. In this operation, we use a mirror manager pair table 140 as illustrated in FIG. 9 to store mirror information. The mirror manager pair table. 140 consists of a pair number 141 to identify a mirror pair, a consistency group number (C.G. No.) 142 to indicate a consistency group in which mirror manager 34 serializes I/Os among volumes and de-duplicates data within the group.

Mirror manager pair table 140 also includes primary and secondary volume information and status of de-duplication 136 to indicate the status of de-duplication 136 for each pair to indicate a current state of the secondary volume regarding de-duplication. The status of de-duplication may be in one of three states: "processed" (i.e., de-duplication is completed), "processing" (i.e., de-duplication is currently being carried out), or "un-processed" (i.e., still awaiting de-duplication processing). A de-duplication flag 137 is included for each consistency group to indicate whether the mirror manager is to execute de-duplication (Yes) or not (No) for the secondary volumes in that consistency group.

The primary and secondary volume information consists of serial number 143, 147 for the storage system on which each volume resides; port 144,148 and LUN 145, 149 by which each volume is accessed, and volume number (VOL) 146, 135 for each volume. In the embodiment illustrated in FIG. 4, the same storage system 30 is used for both the primary volumes 49 and secondary volumes 50. Thus, for this embodiment, the serial number of the storage system for the primary volumes in column 143 is as same as the serial number for the secondary volumes in column 147, as illustrated in FIG. 9A. However, in other embodiments described below, the secondary volumes are located in a separate storage system, and include different serial number in column 147, as illustrated in FIG. 9B.

Resync and Reverse Resync Operation

A resync operation synchronizes (mirrors) updates made to primary volumes to secondary volumes under a specified consistency group. Thus, whenever an update is made to primary volume 49, the corresponding secondary volume 50 that forms a mirror pair with the updated primary volume must be resynchronized to accurately reflect the data state of the primary volume. An administrator specifies a consistency group, and mirror manager 34 executes mirroring operations for all of the volumes included in a specified consistency group.

Figure 10:
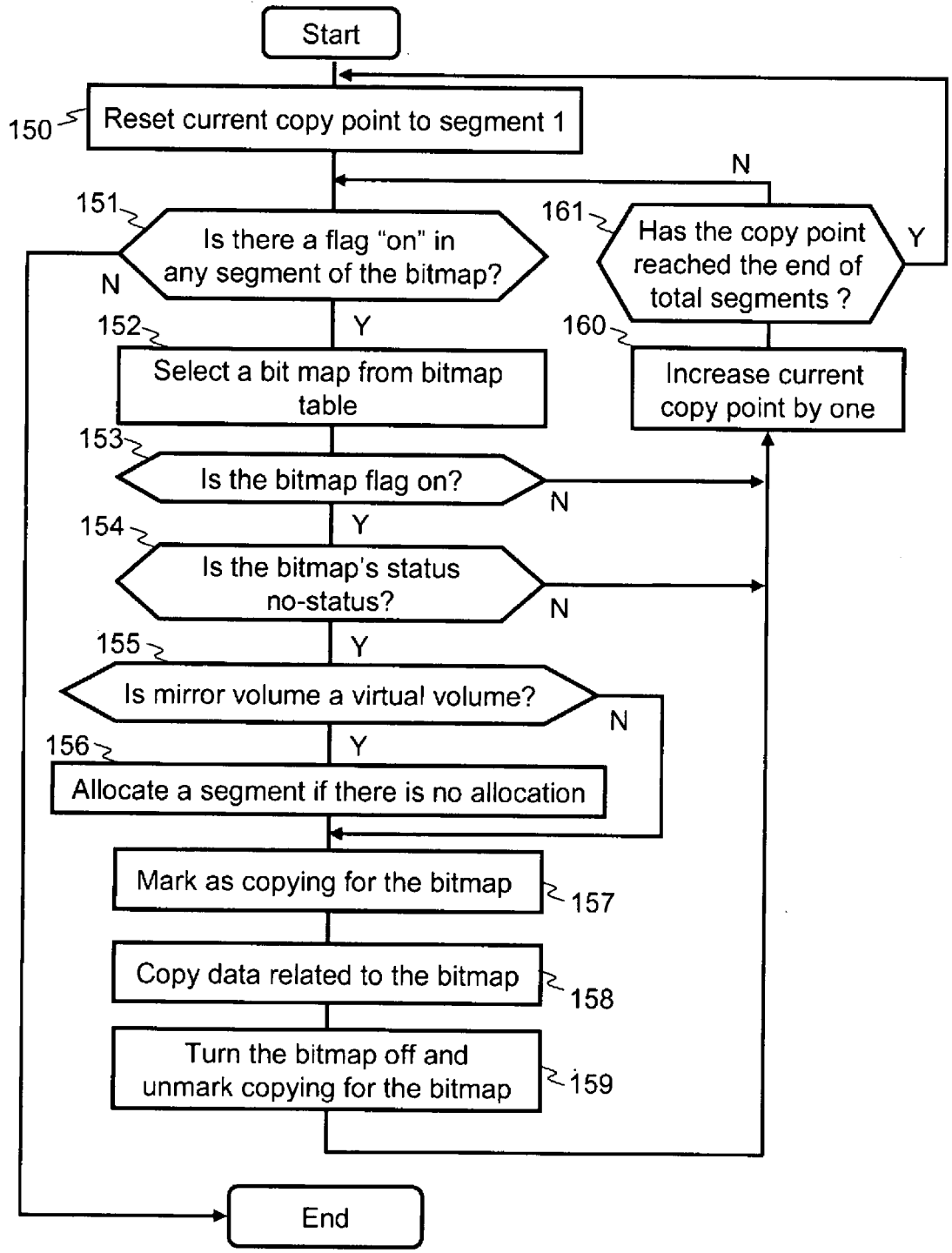
FIG. 10 illustrates a process for resynchronizing and reverse resynchronizing the primary and secondary volumes.
Figures 11, 12:
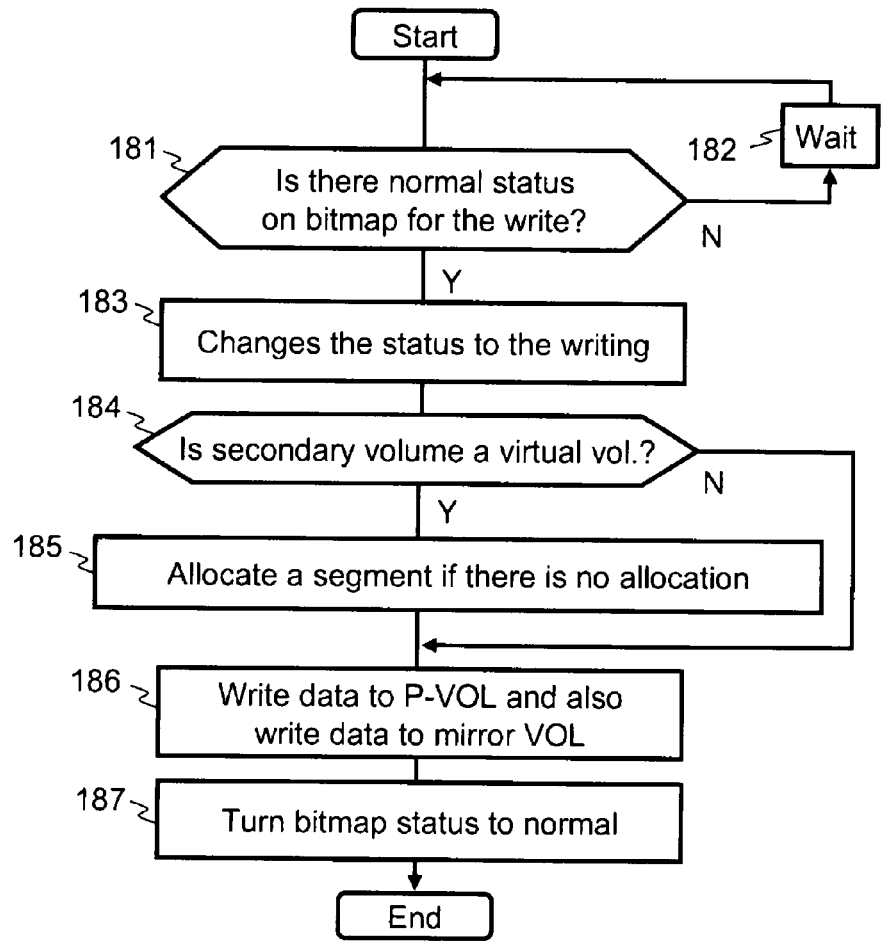
FIG. 11 illustrates a bitmap table.
FIG. 12 illustrates a process of a write operation during the resync operation.

In the mirroring operation, mirror manager 34 uses a bitmap table 170, as illustrated in FIG. 11, for each primary volume to determine the current mirror status of the secondary volume. The bitmap table 170 consists of entries for a segment size 171 for each bitmap, current copying point 172 to identify the current copy point segment in the bitmap table 170, segment number 173 for each segment in the volume, bitmap flag 174 to indicate whether or not the segment was modified by the update(s) made to the primary volume, and status 175 of bitmap to indicate whether the segment is "writing", "copying" or "normal". Thus, when an update is made to primary volume 49, flag 174 for the corresponding segment in bitmap table 170 is changed from "off" to "on" so that the segment in the secondary volume 50 may be updated during the resync operation. The details of the resync operation are set forth in steps 150-160 of FIG. 10, and as described below.

Step 150: Mirror manager resets the current copy point 172 to segment "1" in bitmap table 170.

Step 151: Mirror manager checks whether there is an "on" flag in the flag column 174 for any of the segments the bitmap 170. If it there is at least one segment with an "on" flag in flag column 174, the procedure goes to Step 152. On the other hand if there are no "on" flags, the secondary volume already synchronized with the primary volume, and the procedure goes to the end.

Step 152: Mirror manager select an entry of segment 173 from bitmap table 170 to process copy operation.

Step 153: Mirror manager 34 checks whether the bitmap's flag 174 is "on" for that segment. If the bitmap flag 174 is "on", the procedure goes to Step 154. On the other hand, if the bitmap flag 174 is "off" the procedure goes to Step 160 for preparing to check the next segment in the volume.

Step 154: Mirror manager checks the status 175 for the specified bitmap. If the bitmap's status is "normal", the procedure goes to Step 155. If the bitmap's status is other that normal, such as "writing", the procedure goes to Step 160.

Step 155: Mirror manager checks type of mirrored volume based on volume information column 114 of the volume-port mapping table 110. If the volume is a virtual volume, the procedure goes to Step 156. If the volume is a conventional logical volume, the procedure skips Step 156 and goes directly to Step 157.

Step 156: Mirror manager 34 determines if the segment has already had a chunk of physical storage area allocated to it. If there is not a chunk already allocated, the mirror manager 34 allocates a free chunk of physical storage from segment pool 130 to the volume segment for the current copy point belonging to the start LBA 123 on virtual volume in secondary volume.

Step 157: Mirror manager marks as copying on bitmap's status 175 to indicate currently "copying" data on the segment to target volume's segment Step 158: Mirror manager copies data from the bitmap's specified LBA and the segment size on the source (primary) volume to the LBA and size for the current segment on the target (secondary) volume. For example, if the bitmap segment number is "1" and the size of each segment is 1 MB, then the LBA start address of copying is LBA 0 on VVOL or VOL and the size of data copied is 1 MB copied into segment 1 on VVOL of the secondary volume.

Step 159: When copying is complete, mirror manager 34 turns the bitmap table flag to "off" for the current segment, and changes the status 175 of the current segment from "copying" status back to "normal".

Step 160: Mirror manager increases by one the current copying point 172 to advance to the next segment, and the process returns to step 151 until all segments in the volume have been checked. Once all segments have been checked, Step 161: Mirror manager checks if current copy point is at the end of the total segments within a volume. If it is not, the mirror manager continues to process to step 151. If it is at the end of total segments, mirror manager goes to step 150 to reset the current copy point, and when the process next reaches step 151, the procedure ends.

To resync data from secondary to primary volume, the administrator needs to execute a reverse resync operation. The reverse resync operation is as same as ordinary resync operation described above, except direction of synchronization is from the secondary volume to the primary volume, i.e., the primary volume is updated according to a bitmap table so that the primary volume reflects the data contained in the secondary volume. This might be take place when host computers have been using the secondary volume to store data.

During a resync operation, normal write operations to the primary volume need to be able to take place while the resync operation is going on, even though direct writes to the secondary volume have been disabled. FIG. 12 illustrates a process for carrying out a write operation during a resync operation, including steps 181-187, as described below.

Step 181: Virtual volume manager checks bitmap table 170 to determine the status of segments in the secondary volume which correspond to the write operation's targeted access region on the primary volume, as determined from the starting address and size of the write data. If the status is "normal", the write operation can also be written to the secondary volume, and the procedure goes to Step 183. If the status is other than "normal" for any segment within the region, the procedure goes to Step 182 wait until all segments within the specified region have a "normal" status.

Step 182: Virtual volume manager waits for short period time, such as a few seconds, and then returns to step 181 to again check the status of the corresponding segments in the secondary volume.

Step 183: Virtual volume manager changes the status on bitmap table 170 for the corresponding segments of the secondary volume from "normal" to "writing".

Step 184: Virtual volume manager checks type of secondary volume based on VVOL information in VOL entry 114 of the volume-port mapping table 110 to determine if the secondary volume is a virtual volume or conventional logical volume. If the secondary volume is a virtual volume, the procedure goes to Step 185. On the other hand, if the secondary volume is a conventional logical volume, the procedure skips to Step 186.

Step 185: Virtual volume manager allocates a free segment to current copy point belonging to the start LBA on the virtual secondary volume from segment pool 130 if there is not already a segment allocated to that LBA. The current copy point's start VLBA 123 in virtual volume table 120 is calculated by current copy point 172 multiplied by segment size 171 divided by LBA size of 512 bytes in this embodiment.

Step 186: Virtual volume manager writes the write data to the targeted segment(s) of the primary volume. If the segment keeps data as a fragment within the segment, virtual volume manager reads the segment, modifies the data on the read segment data and writes the segment including the modified data on primary volume. The write data is also written by mirror manager to the corresponding segment(s) on the secondary volume.

Step 187: Virtual volume manager changes the status for the segment on bitmap table from "writing" to "normal", and the procedure ends.

Split with De-duplication

In the first embodiment, the following the process makes a point-in-time copy of data contained in the primary volumes and conducts de-duplication operations on the secondary volumes in a designated consistency group using the steps of the invention discussed above with respect to FIG. 1. The mirror manager carries out Steps 1-3, as discussed above, by resetting the access authorization to the secondary volume by changing the access mode 116 in FIG. 6 to "Deny" or "Read-Only" (Step 1). The resync operation of FIG. 10 is carried out using the bitmap table of FIG. 11 (Step 2), and the mirror manager suspends the pair configuration after end of resync operation (Step 3). The mirror manager checks whether de-duplication should be carried out on the secondary volume by checks the flag of de-duplication 137 for the consistency group in mirror manager pair table 140 (Step 4). If the flag is set for de-duplication, the procedure goes to Step 5 of FIG. 1. If the flag is none, the procedure goes to Step 6.

Figure 13:
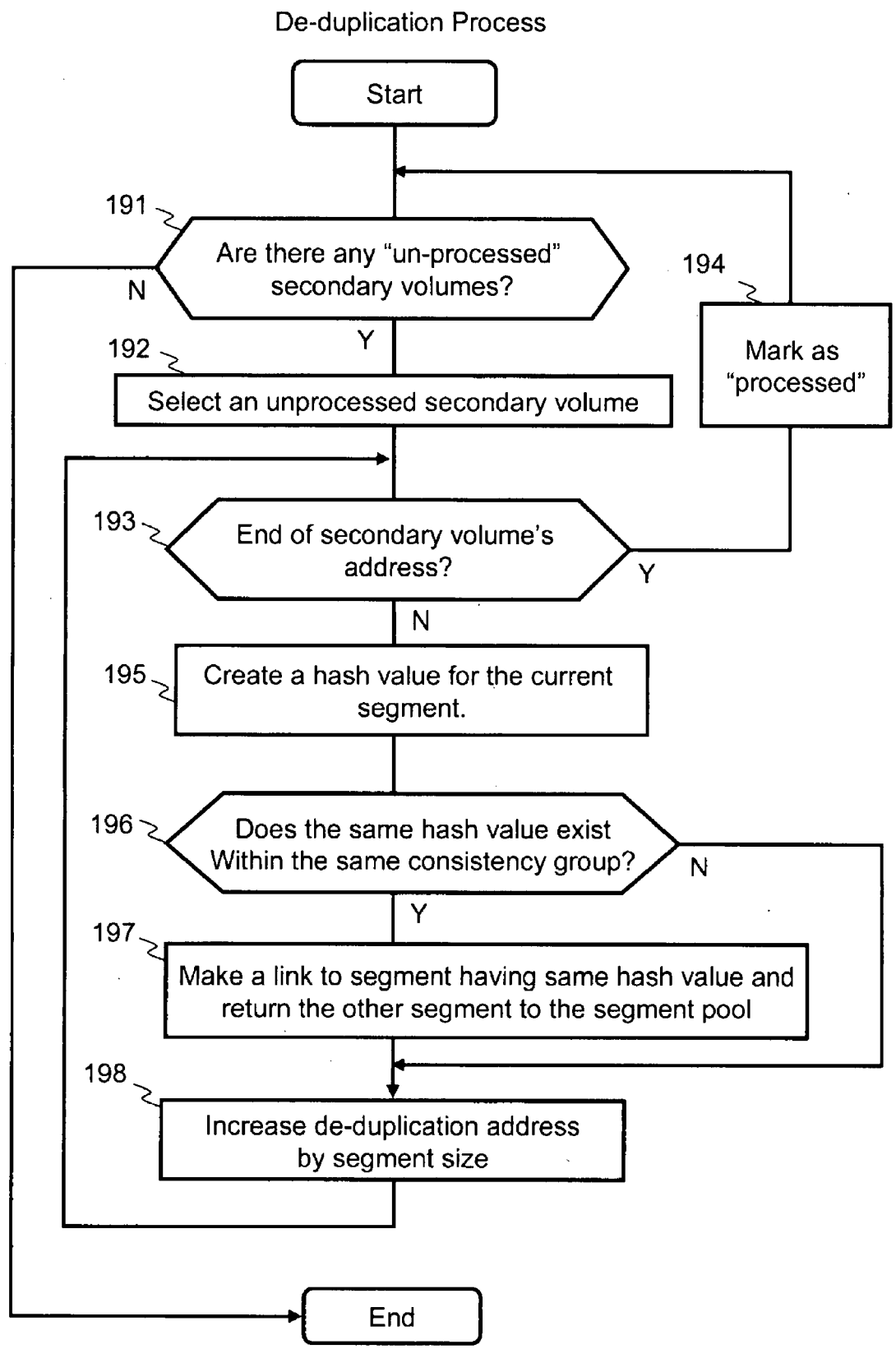
FIG. 13 illustrates details of the de-duplication process.

In Step 5 of FIG. 1, mirror manager de-duplicates data on the secondary volumes in the consistency group. The details of the de-duplication process are illustrated in FIG. 13, and include steps 191-198, as described below.

Step 191: Mirror manager checks whether there are "un-processed" secondary volume in the consistency group requiring de-duplication based on the status information 136 in the mirror manager pair table 140 in FIG. 9. If there is an unprocessed secondary volume, the procedure goes to Step 192 to process the secondary volume. On the other hand, if there are no unprocessed secondary volumes, the procedure is complete, and the procedure ends.

Step 192: Mirror manager selects for de-duplication an "un-processed" secondary volume from the consistency group by referring to the status information 136 in the mirror manager pair table 140 in FIG. 9. Mirror manager changes the state of the selected secondary volume from "unprocessed" to "processing" and resets a current de-duplication address to "0", i.e., which is the address of the first segment of the secondary volume at which the de-duplication process will begin. In the following steps, each segment of the volume is checked sequentially for redundant data.

Step 193: Mirror manager checks if the current de-duplication address is still within the secondary volume's address space by referring to the secondary volume's size information 122 in virtual volume table 120. If it is, then the end of the secondary volume has not yet been reached and the procedure goes to 195. On the other hand, if the current de-duplication address is outside the secondary volume's address space, then the end of the secondary volume has been reached and the procedure goes to step 195.

Step 194: Mirror manager marks as "processed" in the status information 137 for the secondary volume, and the procedure returns to Step 191.

Step 195: Mirror manager creates a hash code value for the data contained in the current segment if the segment number 125 in virtual volume table 120 indicates that a segment has been allocated (i.e., "is allocated" for the current de-duplication address; a dash ("—") indicates "unallocated". For determining the hash code values to uniquely identify data, the process may use the MD5 hash algorithm with check sum for segment data, the SH-1 hash algorithm with check sum for segment data, or various other hash algorithms. Mirror manager writes the hash code value into column 126 of virtual volume table 120 for the current segment.

Step 196: Mirror manager checks if there is same hash code value as the newly determined hash code value within the same consistency group. If an identical hash code value is located within the consistency group, then the data is determined to be redundant, and this procedure goes to Step 197. On the other hand, if the identical hash code is not located within the consistency group, then the data is not redundant and the procedure goes to Step 198.

Step 197: The data has been determined to be redundant, so mirror manager 34 creates a link from the located segment with the matching hash code to the segment currently being checked. Mirror manager 34 stores segment number of the matched on the segment information 125 for the current segment, and turn on the link status 127 as yes. The current segment may then be returned to the free segment pool.

Step 198: Mirror manager increases the current de-duplication address 127 by the size of one segment 124 so that the data in the next segment in the volume may be examined. When all allocated segments have been processed and all secondary volumes in the consistency group have been processed, the procedure of FIG. 13 ends. Once the de-duplication of the secondary volumes is complete, the mirror manager may reset the access settings for the secondary volumes to enable them to accept all I/O operations, as set forth in step 6 of FIG. 1.

As discussed above, with reference to FIG. 2, when a user wants to restore data from a secondary volume to a corresponding primary volume in the first embodiment, steps 11-15 of FIG. 2 are carried out. The mirror manager prohibits access to the secondary volumes by changing the access mode 116 in FIG. 6 to Deny or Read-only (Step 11). Mirror manager then checks the de-duplication flag 152 for the consistency group (Step 12). If the flag is set for de-duplication, the procedure goes to Step 13, and if the flag is not set, the procedure goes to Step 14 and the data is restored from a convention secondary volume.

When a secondary volume has been the subject of the de-duplication operation of the invention, and the mirror manager 34 resynchronizes data from the secondary volume to the primary volume, the mirror manager must take into account that the secondary volume is a virtual volume and has been de-duplicated to remove redundant segments (Step 13). Thus, the restore operation uses the same steps as if a host computer were trying to read secondary volume directly. For example, after the split and de-duplication of a secondary volume, a host computer or other user may want to access the secondary volume. Thus a read or write operation on a virtual volume that has been de-duplicated under the invention is substantially different from a read or write request for a conventional logical volume. The process carried out when a read request is received is set forth in FIG. 14, while the process carried out when a write request is received is set forth in FIG. 15.

Figure 14:
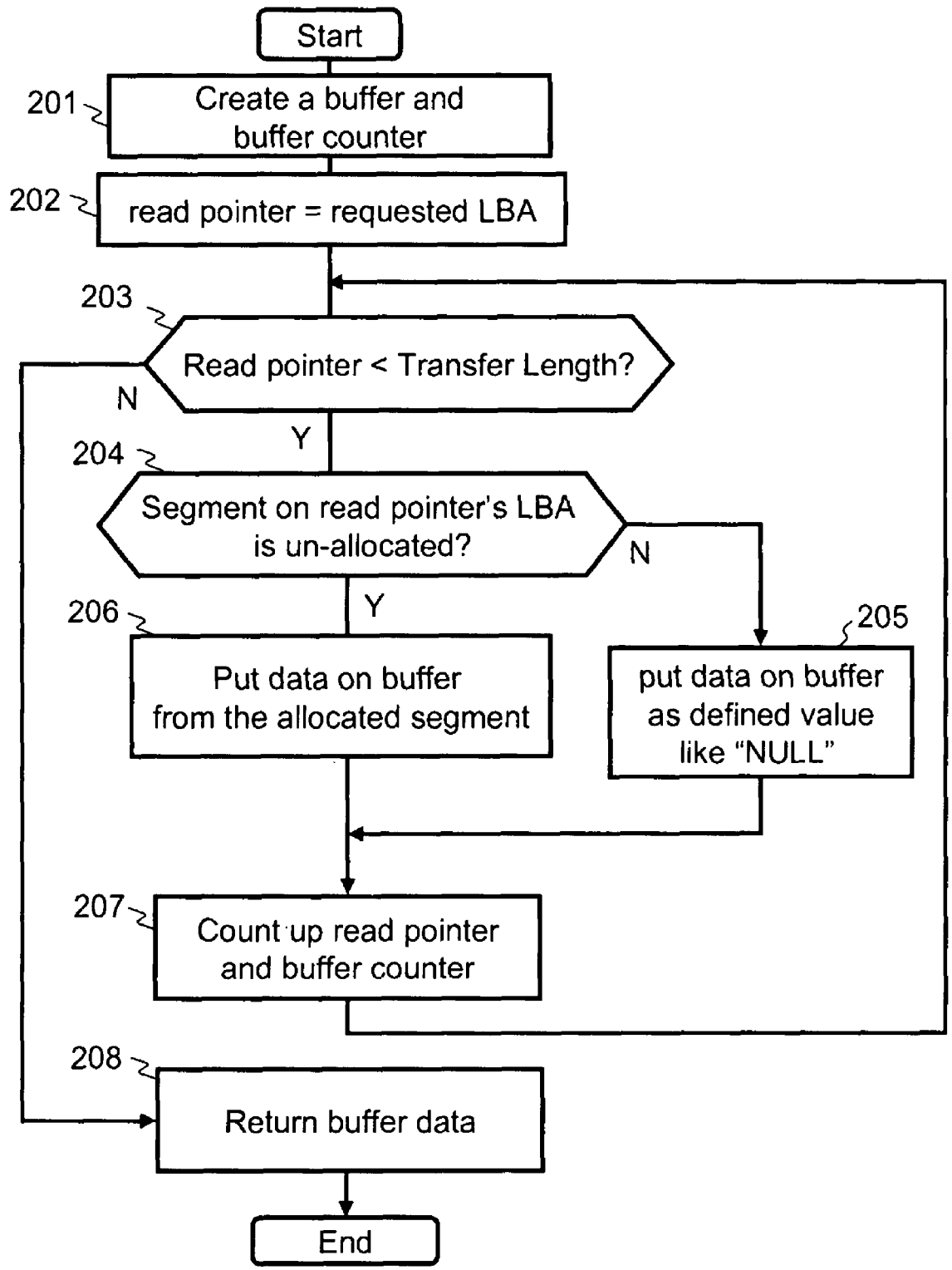
FIG. 14 illustrates the process in a secondary volume for a read operation after split.

When virtual volume manager 35 receives a read request from host computer 20 via port 38, it executes the procedure set forth in FIG. 14, including steps 201-208, as described below.

Step 201: Virtual volume manager 35 creates a buffer in which size is defined by Transfer Length (e.g., from 32 to 39 bits in SCSI Read(6) command), and prepares a buffer_counter to write data on the buffer from the virtual secondary volume. The buffer_counter is initially set as "zero".

Step 202: Virtual volume manager prepares a read_pointer to indicate a current read point on a LBA on the virtual secondary volume and resets the value as SCSI Read requested LBA (e.g., from 11 to 31 bits in SCSI Read(6) command).

Step 203: Virtual volume manager checks whether the read pointer is less than the requested Transfer Length in case that buffer starts from zero. If it is, the procedure goes to Step 204. If it is not, the procedure goes to Step 208.

Step 204: Virtual volume manager checks whether a segment specified by the read_pointer LBA is allocated on the virtual volume. If a segment is allocated for the read_pointer LBA, the procedure goes to Step 206. If a segment is not allocated, then this procedure goes to Step 205.

Step 205: Since a segment is not allocated for the LBA requested by the read command, the virtual volume manager writes null data or user/system defined characters onto the buffer from buffer_counter to buffer_counter plus size of the read command within the segment.

Step 206: Since a segment is allocated for the LBA requested by the read command, the virtual volume manager reads the data on the segment specified by segment number 125 from the LBA which is specified by read_pointer to the end of a segment which is specified by start LBA 123 plus segment size 124, and then puts the data on the buffer from buffer_counter to buffer_counter plus size of read data. Thus, if the original segment corresponding to the LBA was released during de-duplication, then the linked segment is listed in column 125, and the data is read from the linked segment.

Step 207: Virtual volume manager increases the buffer counter up by the size of the written data on the buffer, and virtual volume manager increases the read pointer by the size of the read data from the segment.

Step 208: Virtual volume manager returns the buffer data as the return for the SCSI read command.

Figure 15:
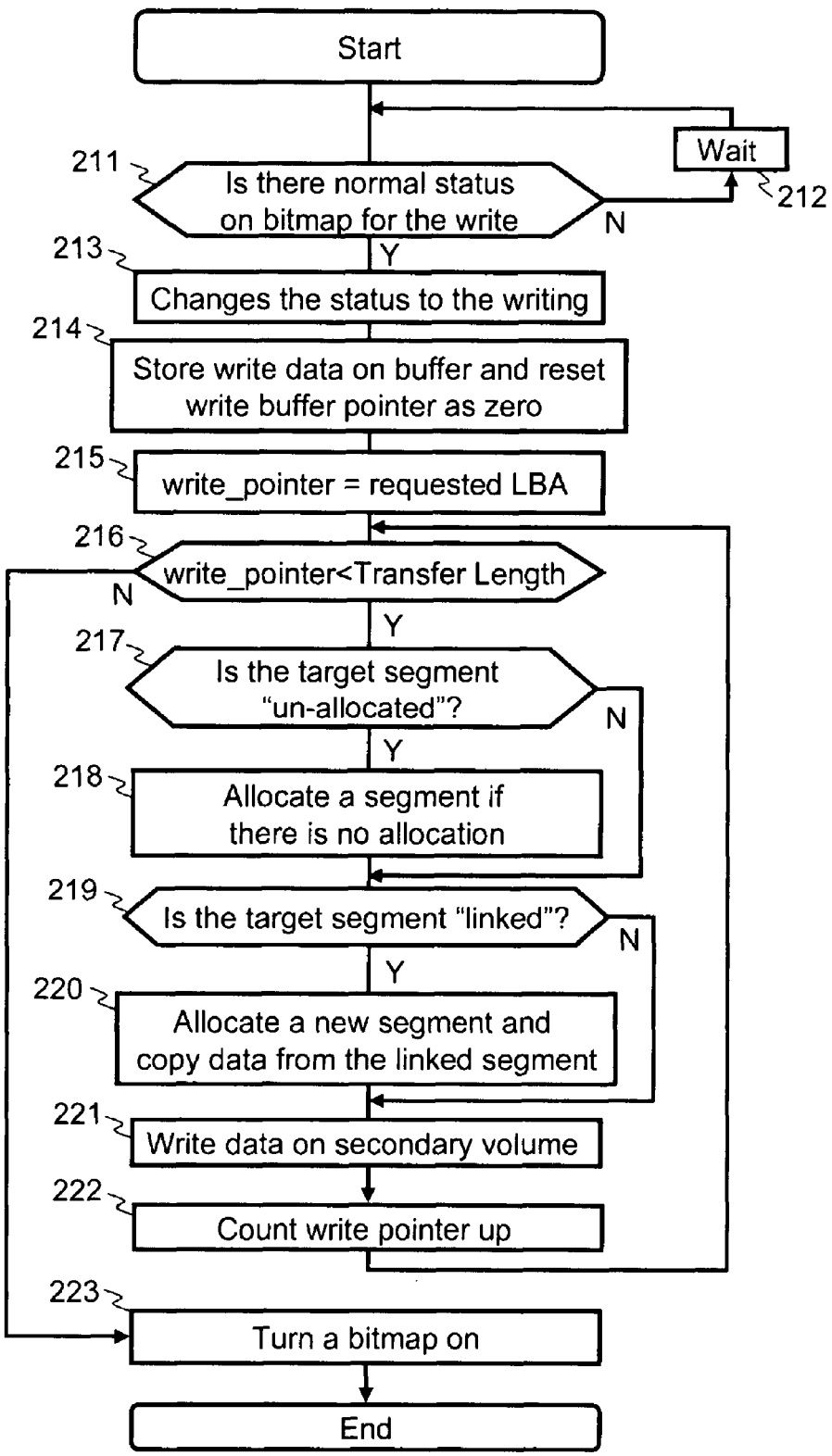
FIG. 15 illustrates the process in a secondary volume for a write operation after split

When virtual volume manager 35 receives a write request from a host computer 20 via port 38 directed to a secondary volume that has been de-duplicated under the invention, the procedure of FIG. 15 is executed, including steps 211-223, as described below.

Step 211: Virtual volume manager 35 checks whether the status on segments which include the write operation's access region from the starting address plus the size of the write data is "normal" by checking bitmap table 170. If the status is normal, the procedure goes to Step 213. If the status is not normal for one or more of the segments within the region, the procedure goes to Step 212.

Step 212: Virtual volume manager waits for short period time, such as a few minutes and again goes to step 211 to determine if the status for all segments in the write operation access region are normal.

Step 213: Virtual volume manager changes the status for the affected segments on bitmap table 170 from "normal" to "writing".

Step 214: Virtual volume manager writes the host-provided write data onto a write buffer on the controller's memory 17 and resets the write buffer pointer to zero to indicate the current writing point on the write buffer.

Step 215: Virtual volume manager prepares a write_pointer to indicate the current writing point on the LBA in the virtual volume, and resets the value as a SCSI Write requested LBA (e.g., from 11 to 31 bits in a SCSI Write(6) command).

Step 216: Virtual volume manager checks if the write_pointer is under (less than) the requested Transfer Length. If it is, the procedure goes to Step 217. If it is not, this procedure goes to Step 223.

Step 217: Virtual volume manager checks whether the target segment specified by the write_pointer's LBA has already been allocated by referring to segment number column 125 in virtual volume table 120. If column 125 contains a dash ("—"), then the segment has not yet been allocated, and the procedure goes to Step 218. If column 125 contains a segment number then the segment has been allocated, and the procedure skips to Step 219.

Step 218: Virtual volume manager allocates a free segment from segment pool 130 to the virtual volume for the write_pointer for the start LBA.

Step 219: Virtual volume manager 35 checks if the target segment specified by write_pointer's LBA is "linked" to another segment in the consistency group by check linked column 127 in virtual volume table 120. If the target segment is linked, the procedure goes to Step 220. If the target segment is not linked to another segment, the procedure goes to Step 221.

Step 220: Since the target segment for the write operation is linked, i.e., there is not an actual segment allocated, but instead, a different segment contains the same data, virtual volume manager allocates a free segment and copies the data from the linked segment. Then, virtual volume manager changes the segment number from the linked segment to the allocated segment and turns the link status of the allocated segment to show that it is not linked, as indicated by a dash ("—") in the linked column 127.

Step 221: Virtual volume manager writes data to the secondary volume on the segment indicated by the write_pointer. If the write to the segment is a fragment within the segment because the write_pointer's address is not equal to the segment LBA, virtual volume manager reads the data in the segment, updates the read data with the write data, and the writes the modified data back on to the segment.

Step 222: Virtual volume manager counts write buffer counter up by size of write data on the buffer, and virtual volume manager increases the write_pointer by the size of the write data from the segment.

Step 223: Virtual volume manager changes the status for the segment 175 on bitmap table from "writing" to "normal" and the bitmap flag 174 from "off" to "on", and the procedure ends.

Deleting a Mirror Pair or a Consistency Group

When a user wants to delete the mirroring pair, an administrator executes a "delete pair" operation specifying the pair number to agent 29. Mirror manager 34 on storage system 31 receives the delete pair operation and deletes the entry of pair for the specified pair number.

Also when a user wants to delete a consistency group, an administrator executes a "delete consistency group" operation by specifying the consistency group number to agent 29. Mirror manager on storage system 30 receives the operation and deletes all entries of pairs for the specified consistency group number and also the entry for the specified consistency group.

Embodiment 2

Remote Mirror Using a SAN

Figure 16:
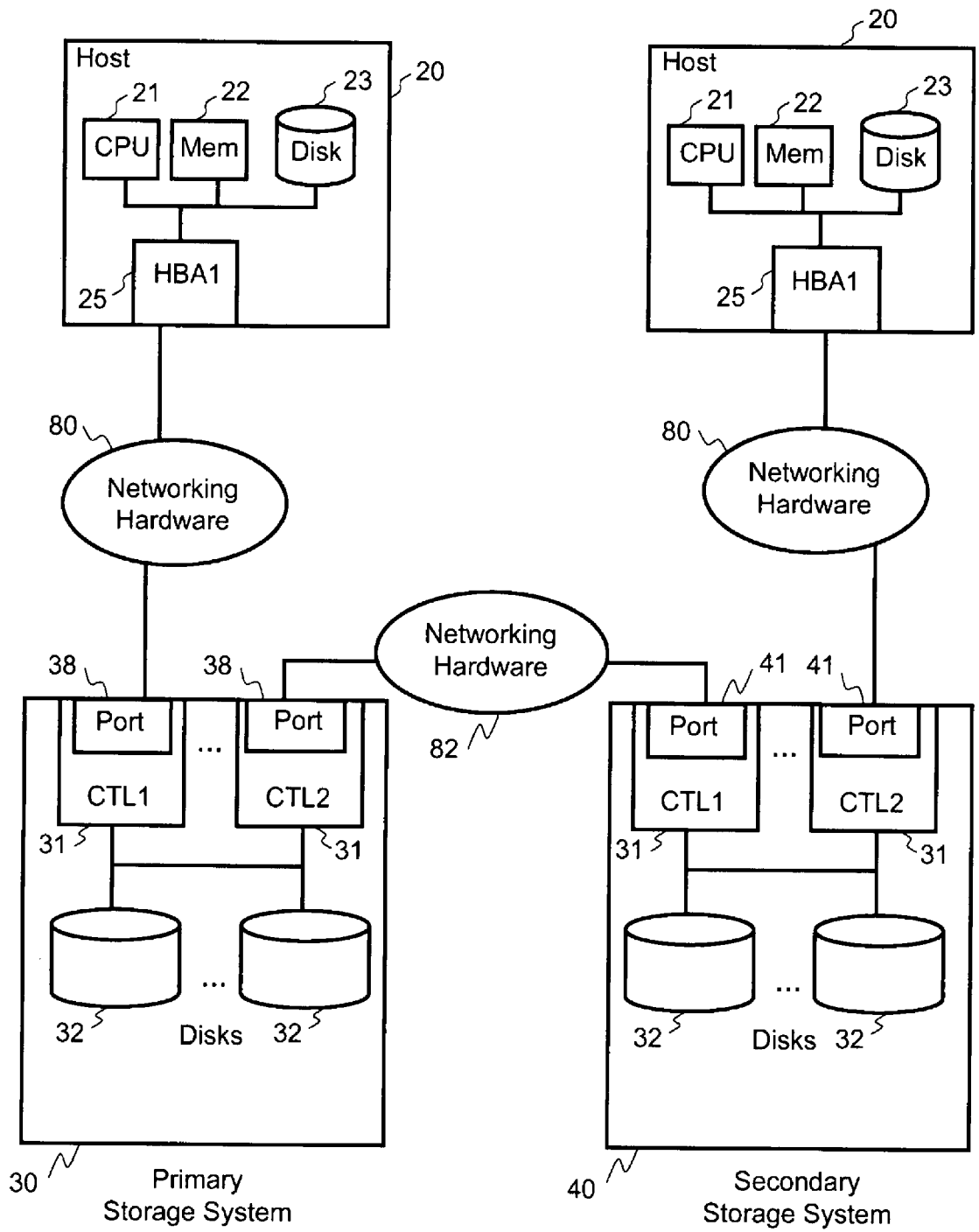
FIG. 16 illustrates the physical configuration of another embodiment of the invention.

The second embodiment 2 implements a remote mirror configuration using a SAN. The differences between the first and second Embodiments are discussed below. FIG. 16 illustrates the physical configuration of the second embodiment. A secondary storage system 40 is connected for communication via networking hardware 82 to primary storage system 30. The secondary storage system 40 may be of the same hardware configuration as primary storage system 30, with a port 41 to distinguish from port 38 on primary storage system 30. Using ports 38 and 41, the storage systems 30, 40 are able to communicate with each other. A second host 20 is connected for communication with secondary storage system 40 via networking hardware 80.

The networking hardware 82 between storage systems 30, 40 may be a switch, router, or the like located between ports 38 and 41, for transmitting block level command sets such as SCSI (Small Computer System Interface) or ESCON (Enterprise Systems Connection) commands. The hardware 82 may be a generic Fibre Channel (FC) switch, Ethernet Switch, Ethernet hub, or Internet Protocol (IP) Router. Thus, the logical connection 82 between storage systems 30, 40 may be a SAN that is part of SAN 81, or may be a storage wide area network (SWAN), or other network type.

Figure 17:
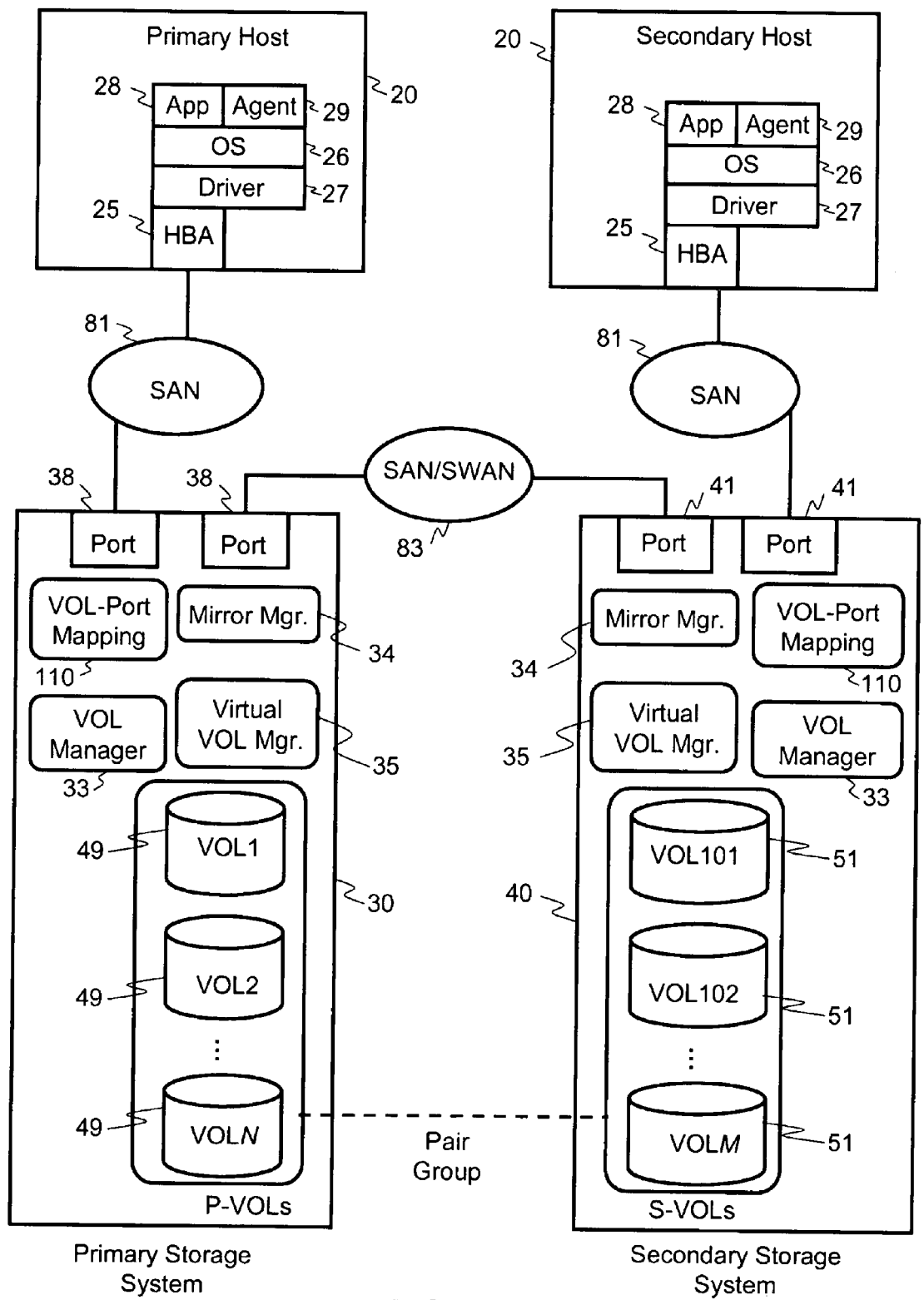
FIG. 17 illustrates the logical configuration of the embodiment of FIG. 16.

FIG. 17 illustrates a logical configuration of the embodiment of FIG. 16. Secondary storage system 40 includes a mirror manager 34, a VOL-Port mapping table 32, a virtual volume manager 35 and a volume manager 33. To replicate data between primary storage system 30 and secondary storage system 40, mirror manager pair table includes primary storage system's serial number in column 143 and secondary storage system serial number in column 147, as illustrated in FIG. 9B. A plurality of secondary volumes 51 are located in secondary storage system 40 that mirror data on primary volumes 49 in primary storage system 30. Other capabilities of primary storage system 30 and secondary storage system 40 are the same as described above for the first embodiment.

Because the secondary volumes 51 are located in secondary storage system 40, the storage administrator must setup the virtual volumes on the secondary storage system 40. The operation of the invention is the same as described above for the first embodiments. In particular, the secondary volumes 51 may be synchronized with the primary volumes 49, split, and the data contained subjected to de-duplication. The processes for conducting the resync, de-duplication, restore, reading, and writing operations are the same as described above.

Embodiment 3

Local Mirror with Storage Virtualization Apparatus Configuration

Figure 18A:
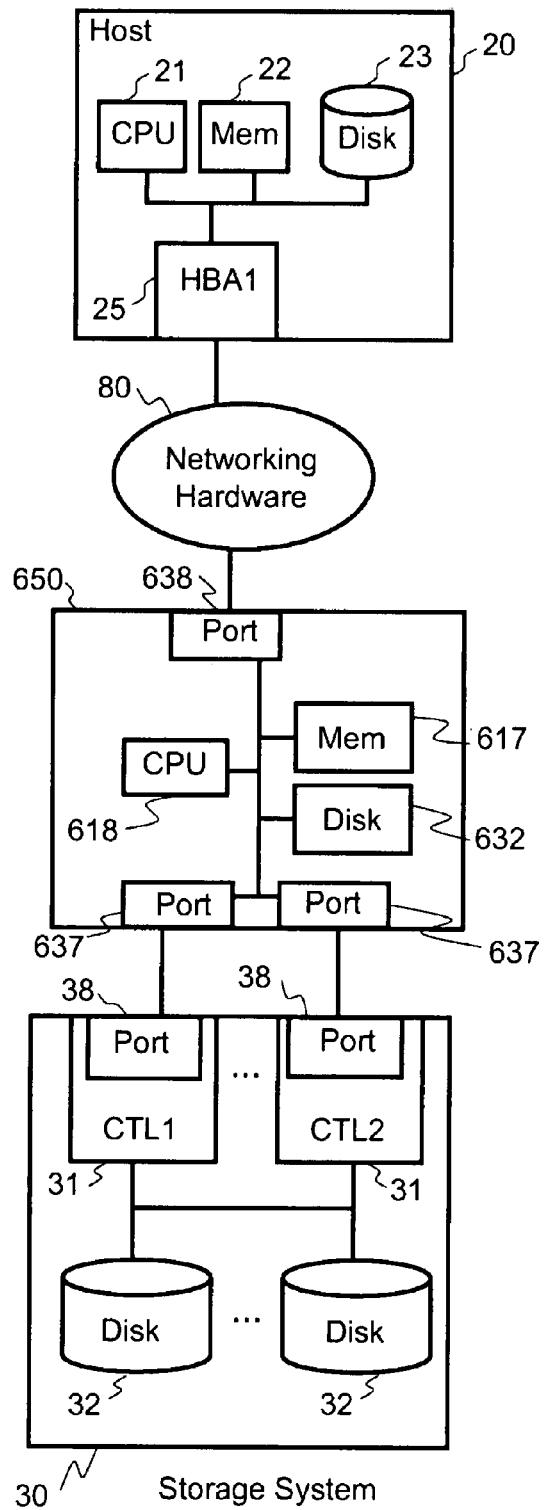
FIGS. 18A-18D illustrate the physical and logical configurations of additional embodiments of the invention.
Figure 18B:
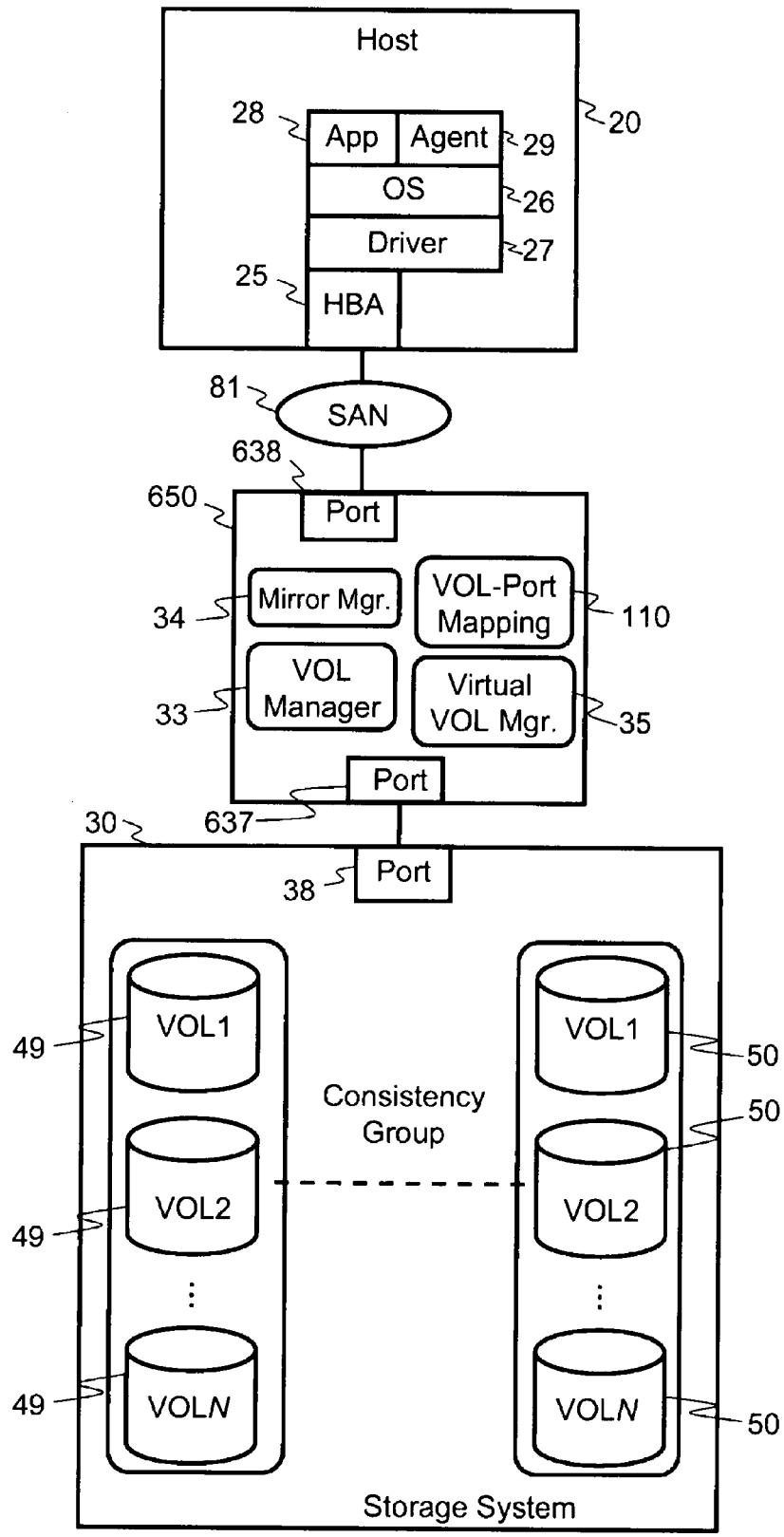

FIG. 18A illustrates a physical configuration of the third embodiments of the invention, while FIG. 18B illustrates the logical configuration. The illustrated embodiment is an example of a hardware configuration that includes a storage virtualization apparatus 650 in communication with host computer 20 and storage system 30, whereby virtualization apparatus 650 is able to present virtual volumes to host computer 20, while the data for the virtual volumes is actually stored in one or more external storage systems, such as storage system 30. Thus, virtualization apparatus is able to receive data addressed by host computer 20 as if it were an actual storage system, and then forward the received data to the external storage system for storage of the data. Storage virtualization apparatus 650 may be an apparatus such as TagmaStore® Universal Storage Platform, available from Hitachi Data Systems, of Santa Clara, Calif.

Host computer 20 is connected for communication with storage virtualization apparatus 650 via SAN 81 (networking hardware 80) and port 638. Storage virtualization apparatus 650 is also connected for communication on its back end with primary storage system 30 via port 637. This may either be a direct connection, or may be a connection via SAN 81 or other network. In this configuration, storage virtualization apparatus 650 may include a CPU 618, a memory 617, a hard disk drive 632, and may have the same capabilities as storage system 30 in FIG. 4 discussed above. Thus, mirror manager 34, volume-port mapping 110, volume manager 33, and virtual volume manager 35 may be modules installed on virtualization apparatus 650. A primary volume and/or a secondary volume to be used by a host computer 20 may be created on disk device 632 contained within storage virtualization hardware 650, or may be created on external storage systems 30. In the example illustrated in FIG. 18B, a consistency group is created with primary volume 49 and local secondary volumes 50 on storage system 30.

To manage volumes created on external storage system 30, storage virtualization apparatus 650 may include an external volume mapping table, as illustrated in FIG. 19. When the storage virtualization apparatus 650 discovers external volumes on external storage 30, the external volumes are registered with an external volume number (Ex-VOL number) as identifier of virtualization apparatus's volume number 301, the size for the external volume (LU) 302, WWN for the port of the external storage system 303 for accessing the external volume, and then LUN 304 on external storage system for accessing the external volume. Volume manager can use the registered Ex-VOL number, such as Ex-VOL 1 instead of VOL 1 as volume 114 in volume-port management table 110 of FIG. 6. The external storage system is able to provide conventional LUs which consist of volumes and RAID configured-disks, as discussed above for storage system 30 in the first embodiments.

Embodiment 4

Remote Mirror with Storage Virtualization Apparatus Configuration

Figure 18C:
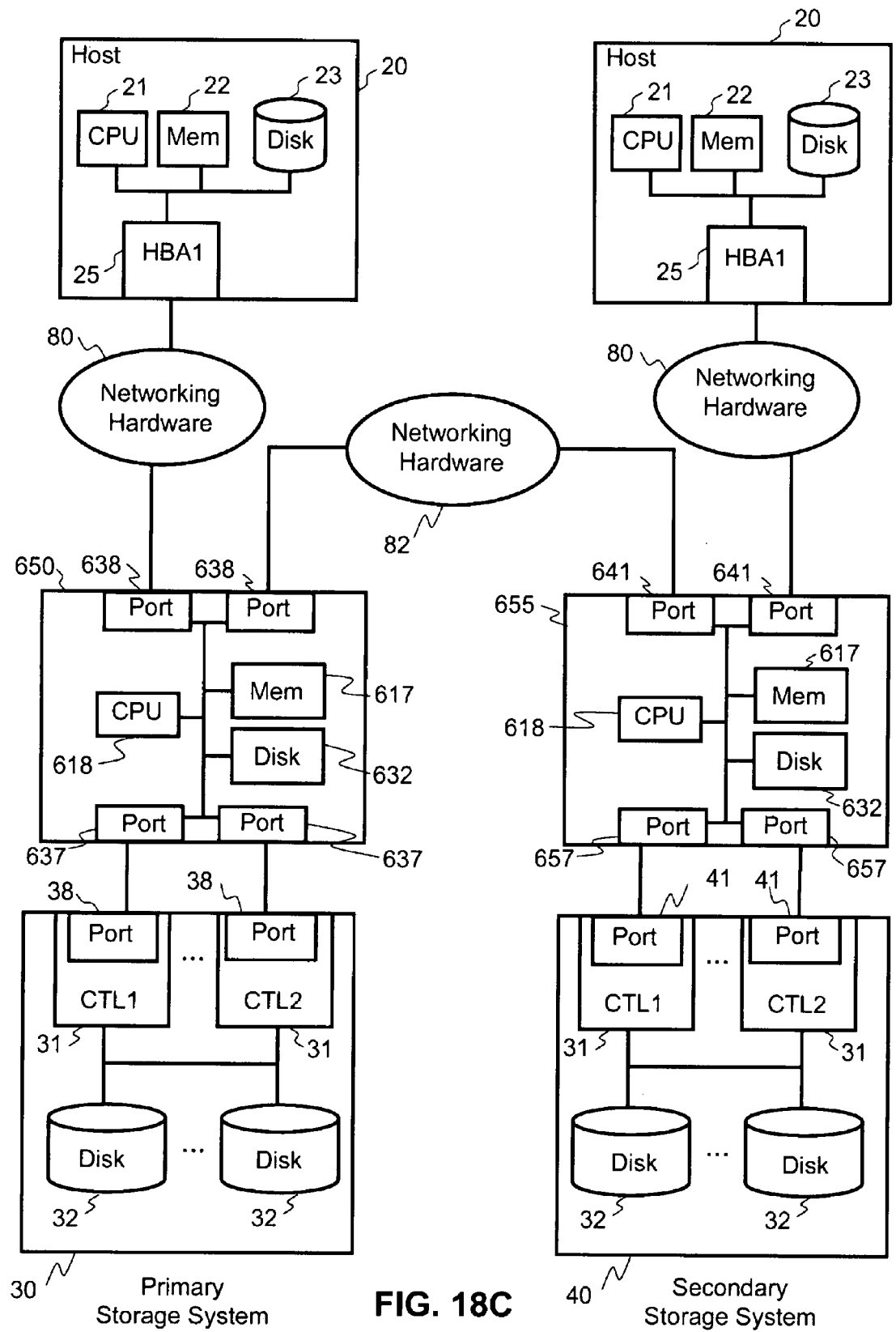
Figure 18D:
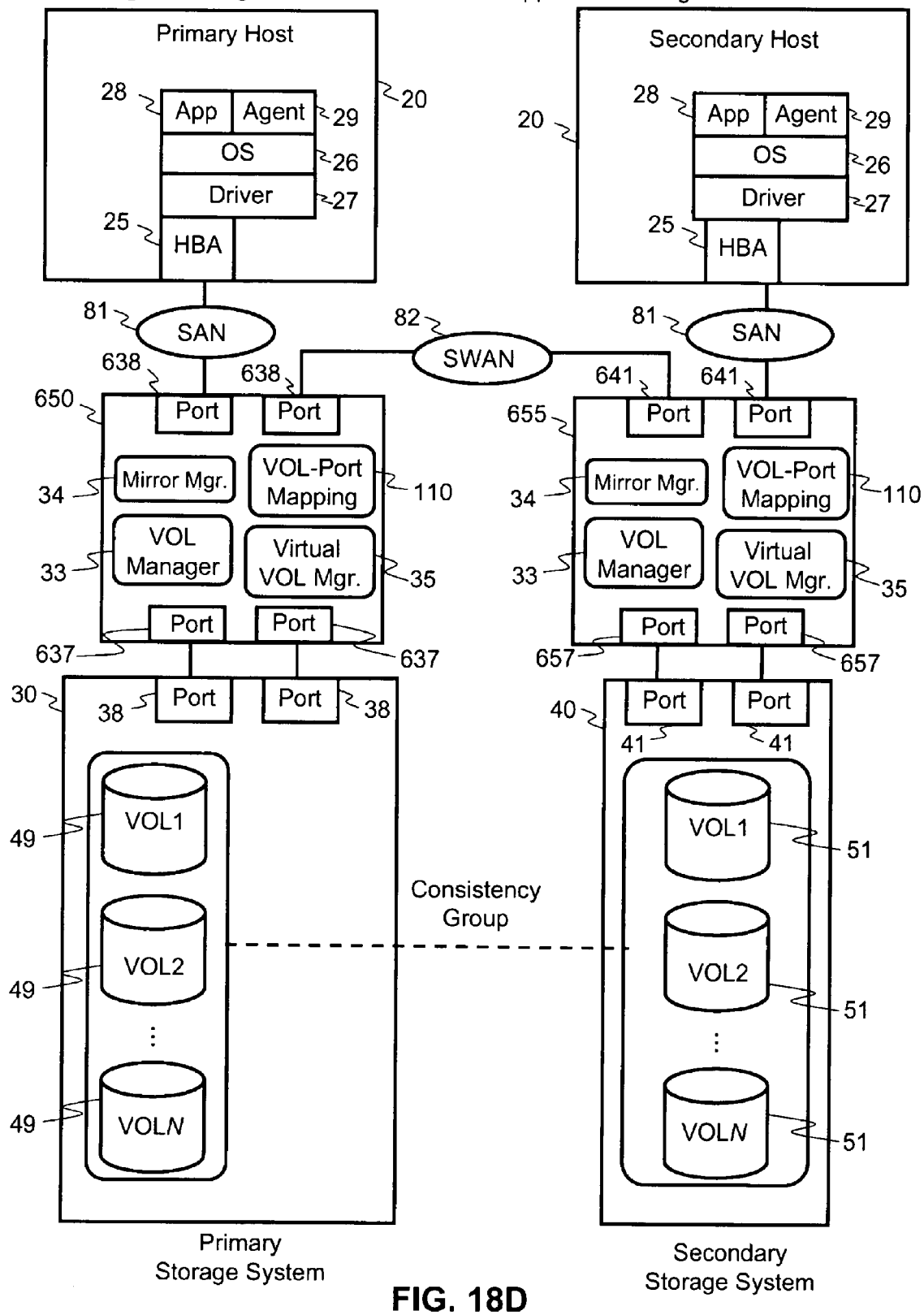

The fourth embodiment is another configuration that uses a storage virtualization apparatus, such as Hitachi's TagmaStore® Universal Storage Platform. In this embodiment, first and second host computers 20 are connected respectively to a first storage virtualization hardware 650 and a second storage virtualization hardware 655, as illustrated in FIGS. 18C-18D. First host computer 20 is connected for communication with first storage virtualization apparatus 650 via SAN 81 (networking hardware 80) and port 638. First storage virtualization apparatus 650 is also connected for communication on its back end with primary storage system 30 via port 637. Similarly, a second storage virtualization apparatus 655 is connected for communication with a second host 20 via port 641 and SAN 81 (networking hardware 80), and second storage virtualization apparatus 655 is connected for communication via port 657 on the backend with secondary storage system 40. In the example illustrated in FIG. 18D, a consistency group is created with primary volumes 49 being created on primary storage system 30, and remote secondary volumes 51 being created on secondary storage system 40. To manage volumes created on external storage systems 30, 40, storage virtualization apparatuses 650, 655 may include external volume mapping tables, as illustrated in FIG. 19. The remote mirroring configuration of this embodiment is able to operate in the same manner as the configuration of the second embodiment, described above.

Embodiment 5

Local Mirror under Intelligent Switch-Based Storage Virtualization Configuration As an alternative to using the storage virtualization apparatus 650, 655 discussed above, an intelligent switch may be used to load the mirror manger module 34 and present the primary and secondary volumes. Thus, this embodiment may use intelligent switch hardware, such as CISCO MDS 9000, available from Cisco Systems Inc., San Jose, Calif., as a virtualization apparatus. The logical configuration for the fifth embodiment may be the same as for the third embodiment illustrated in FIG. 18B, in which a primary volumes are mirrored locally within storage system 30. In this configuration, a user is able to use volumes on external storage system 30 for storage, while intelligent switch manages the mirroring, split and de-duplication operations discussed above in the first embodiment. Also, since an intelligent switch generally does not have a large cache, a port on the switch having a memory area may be used to buffer Fiber Channel frames that contain SCSI commands and to mirror the frames using mirror manager 34. To process received access commands, the intelligent switch process the commands using a control processor that includes enough memory to carry out the de-duplication process of FIG. 13. The control processor may be located internally in the intelligent switch, or externally, such as at a PC connected by Fibre Channel. Other capabilities and processes of the fifth embodiment are as same as for the third embodiment described.

Embodiment 6

Remote Mirror under Intelligent Switch-Based Storage Virtualization Configuration The sixth embodiment is another configuration that uses intelligent switch hardware such as the CISCO MDS 9000 discussed above. The logical configuration of this embodiment is the same as the fourth embodiment configuration of FIG. 18D discussed above, with intelligent switches replacing storage virtualization apparatuses 650, 655. In this configuration, a user can use external storage systems 30, 40 for physical storage of data, while the intelligent switches are the target of storage from the view of the host computers 20. The operation of the sixth embodiment is the same as for the fourth embodiment discussed above.

Embodiment 7

Local Mirror using Network Attached Storage

Figure 20:
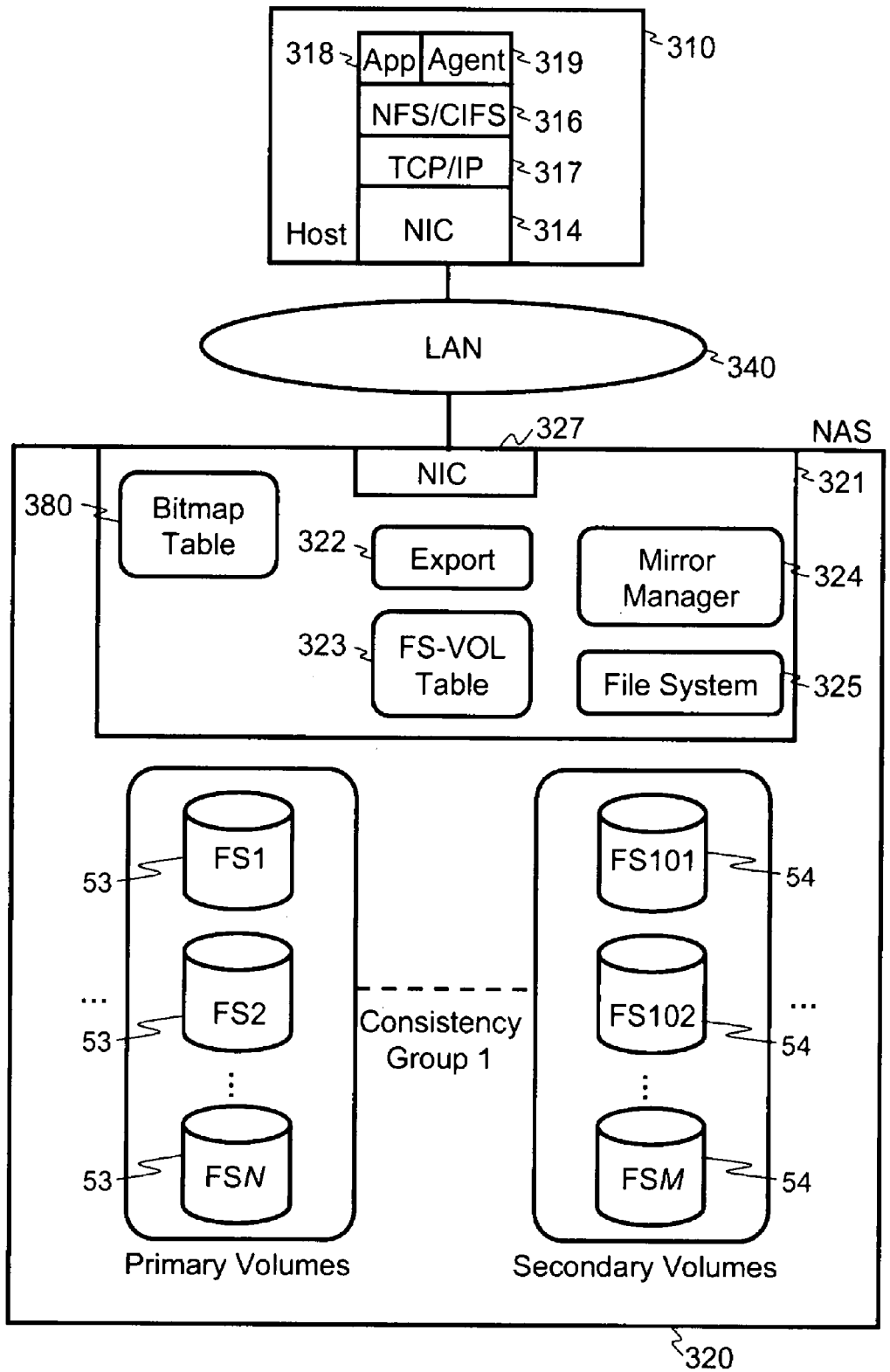
FIG. 20 illustrates a physical and logical configuration of a seventh embodiment of the invention.

This embodiment is another example of an information system of the invention, and includes a local mirror de-duplication configuration in a network attached storage (NAS) environment. FIG. 20 illustrates the physical and logical configuration of the seventh embodiment. The physical configuration consists of a NAS system 320, a host computer 310, and a local area network (LAN) 340. The NAS system 320 includes a controller 321 and a plurality of storage devices (not shown). NAS controller 321 includes a CPU and memory (not shown), and NAS controller 321 also includes a network interface card (NIC) 327 to enable communication via LAN 340. An export table 322, a file system to volume mapping table 323, a mirror manager 324, and a file system (FS) module 325, and bitmap table 380 may be included on NAS controller 321 for carrying out the invention.

The host computer 310 may be a general purpose server, and may be physically the same as host computer 20 of the first embodiment, but with a network interface card (NIC) 314 installed instead of HBA 25. A TCP/IP module 317, a NFS/CIFS module 316, an operating system (not shown), one or more applications 318 and an agent 319 may be included on host computer 310 to send data to and control NAS 320 via LAN 340, and for carrying out the invention. LAN 340 may be implemented by Ethernet switches/hubs, a fiber-distributed data interface (FDDI) or other kind of IP-reachable protocol hardware (not shown).

In order to provide a useable file system namespace to host computer 310 so that host computer can use the file system for storing and retrieving data, an administrator accesses NAS system 320 to perform a setup operation. The setup operation creates one or more volumes from the disk devices, and file system module 325 is used to create manage a file system on the created volume and to export the created file system to host. The setting is information is stored on file system-volume (FS-VOL) mapping table 323 and export table 322.

Figure 22:
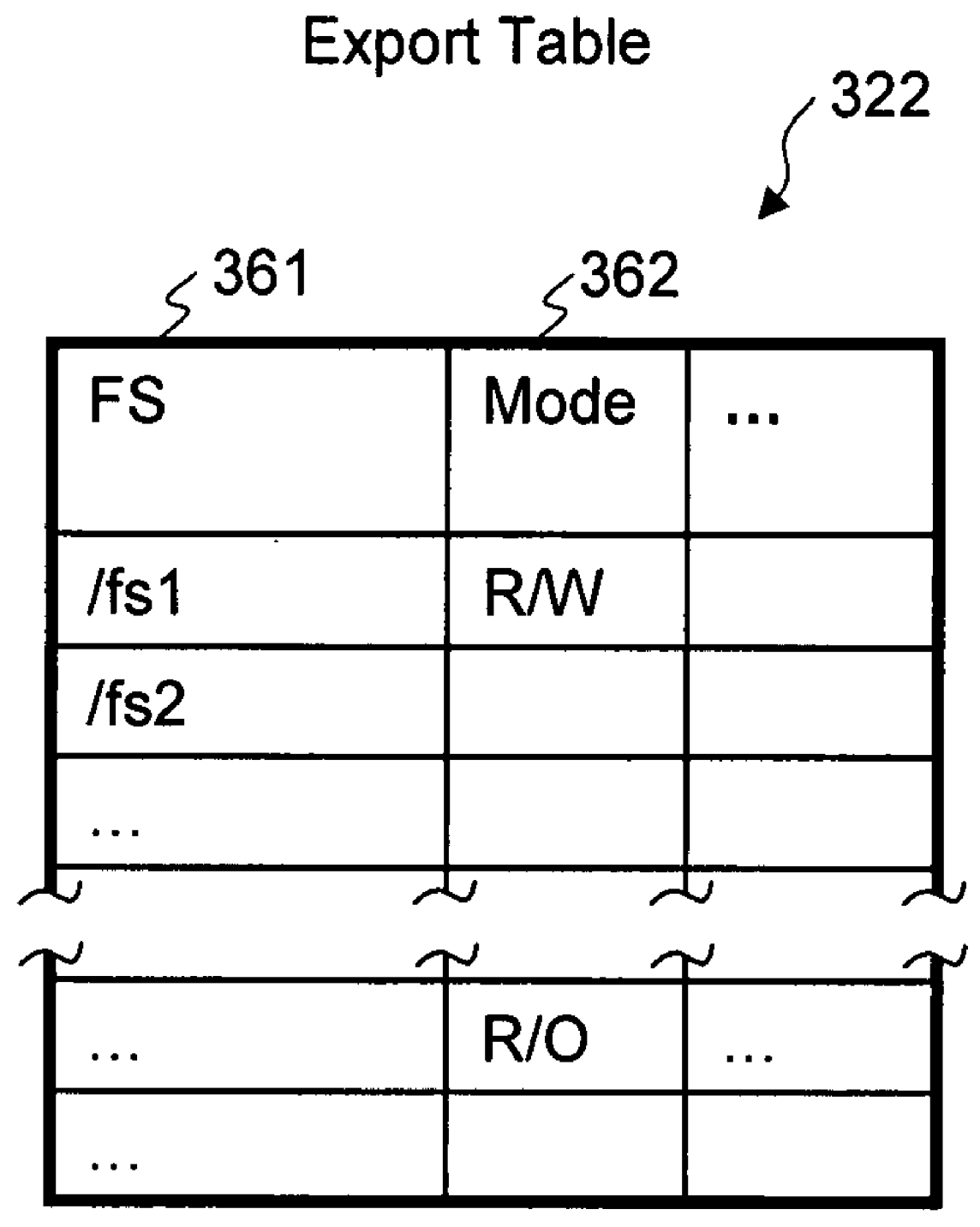

FIG. 21 illustrates file system-volume (FS-VOL) mapping table 323. FS-VOL mapping table includes entries for a device name 351, and a file system mount point from root 352. Similar to virtual volume mapping table 120 of FIG. 7 in the first embodiment, FS-VOL mapping table 323 includes a segment size(Sgmt Size) 358, a filename 353, a block address 354, a segment number(Segmt No.) 355, a hash identifier 356, and a link status 357, which will be discussed further below. FIG. 22 illustrates export table 322, which includes an exported file system directory 361 and access mode 362 specified for the exported file system 361. The access mode for file system operates in the same manner as the access mode in the first Embodiment.

After creation of a volume, NAS system 320 assigns a device name 351 onto FS-VOL mapping table 323. After creation of the file system for that device, NAS system 320 assigns a mounted directory, such as "/fs1", which is stored in file system directory column 352. After exporting of file system to the host computer 310, NAS system 320 the directory becomes an exported directory, and the information is stored in exported file system name 361 in export table 322. In the example embodiment, NAS system 320 de-duplicates the content of files under a consistency group. The following procedure describes how to de-duplicate a file system after a split operation under of a file system mirror.

Operations

The administrator exports a primary file system and a secondary file system to host computer 310. To control NAS system 320, agent 319 is able to control mirror operations for the exported file systems on NAS system 320 via TCP/IP connection over LAN 340.

Using a command line interface on agent 319, or other means, an administrator creates a consistency group and pairs between primary file systems 53 and secondary file systems 54. At this time, the administrator turns the invention's "de-duplication option" on for the consistency group. In this operation, a mirror manager pair table 370 may be used, as illustrated in FIG. 23 to store mirroring information. The pair table 370 consists of a pair number 371 to identify a mirroring pair, a consistency group number 372 to indicate a consistency group in which mirror manager 324 serialize I/Os among file systems, and de-duplicates data within the consistent group. Primary and secondary file systems information and status of de-duplication 377 to indicate whether the de-duplication operation has been "processed", is "processing", or is "un-processed".

The primary and secondary volume information consists of the serial number for the NAS system 373, 375, and the file system 374, 376. In this embodiment, local file systems within the same NAS system 320 are used as the mirror file systems 54. Thus, the serial number 373 for the primary NAS system ("50121") is as same as the serial number 375 for the secondary NAS system ("50121"). Moreover, mirror manager pair table 370 includes the status of de-duplication 377 for each pair to indicate the current state of the secondary file systems regarding de-duplication. A de-duplication flag entry 378 is included for each consistency group to indicate whether the mirror manager 324 should execute de-duplication on the secondary volumes in the consistency group.

Resync/Reverse Resync

Figures 25, 26:
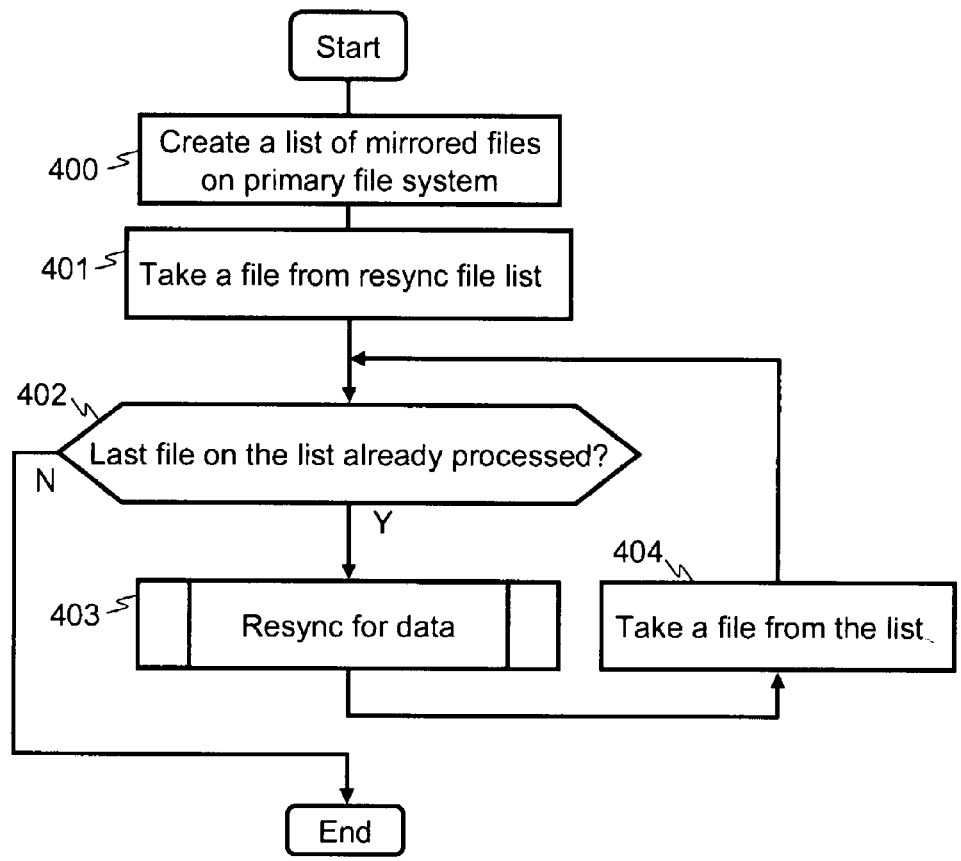
FIG. 25 illustrates an operation for resynchronization according to the embodiment of FIG. 20.
FIG. 26 illustrates a file status list.

Similar to the first embodiment, as resync operation synchronizes the data on the secondary file systems with the data in the corresponding primary file systems under a specified consistency group. The administrator specifies a consistency group, and mirror manager 324 executes a mirror operation for all of the file systems on the specified consistency group. In the mirror operation, mirror manager 324 uses bitmap table 380, as illustrated in FIG. 24, for each file on each file system to determine the current mirror status of each files. The bitmap table 380 consists of a filename 381 to identify the file, a segment size 382 for each bitmap, a current copying point to identify the current copy point 383 in the bitmap, a bitmap segment number 384 to identify each bitmap segment, a bitmap flag 385 to indicate whether the segment was modified or not, and a status of bitmap 386 to indicates whether the segment is "writing", "copying" or "normal". The details of the resync operation for a file system are illustrated in FIG. 25, and include steps 400-404, as described below.

Step 400: Mirror manager 324 creates a list of mirrored files on mirrored primary file system. The mirror manager puts all of files on a file list 413, as illustrated in FIG. 26. The file list 413 includes a target name of a file system 410, a mirrored filename including directory (path) information 411, the status of mirroring 412 to indicate the status mirroring for each file, such as synchronized, resynchronizing, or pending.

Step 401: Mirror manager selects a file from the file list 413 of mirrored files.

Step 402: Mirror manager checks whether all files are mirrored or not. If all files have not yet been mirrored, this procedure goes to Step 403. If all files have been mirrored, this procedure goes to the end of procedure.

Step 403: Mirror manager creates a file including on secondary file system and resyncs the content of file (details of this are discussed below).

Step 404: Mirror manager selects the next file from the list of mirrored files until the procedure ends.

Regarding the resync operation for the actual contents of a file, this embodiment uses Steps 150 to 160 of FIG. 10 and bitmap table 170 of FIG. 11, as discussed above for the first embodiment. However, due to the mirroring of files in this embodiment rather than blocks of data, some changes are necessary for the procedure. The first change is segment size 171: in the present embodiment, a smaller more granular size, such as 2 KB may be used, rather than 1 MB, as in the first embodiment. A second change is the allocation on use virtual volume used in Step 155 and Step 156. In conventional file systems, I-nodes are used to store a portion of the data on each file. Thus, Step 155 can be eliminated, and Step 156 can be changed as follows.

Step 156: Mirror manager allocates a free segment to the current copy point's start LBA in the secondary file system from the free segment pool in the file system. The current copy point's start LBA is calculated by current copy point 172 times segment size 171.

Figure 27:
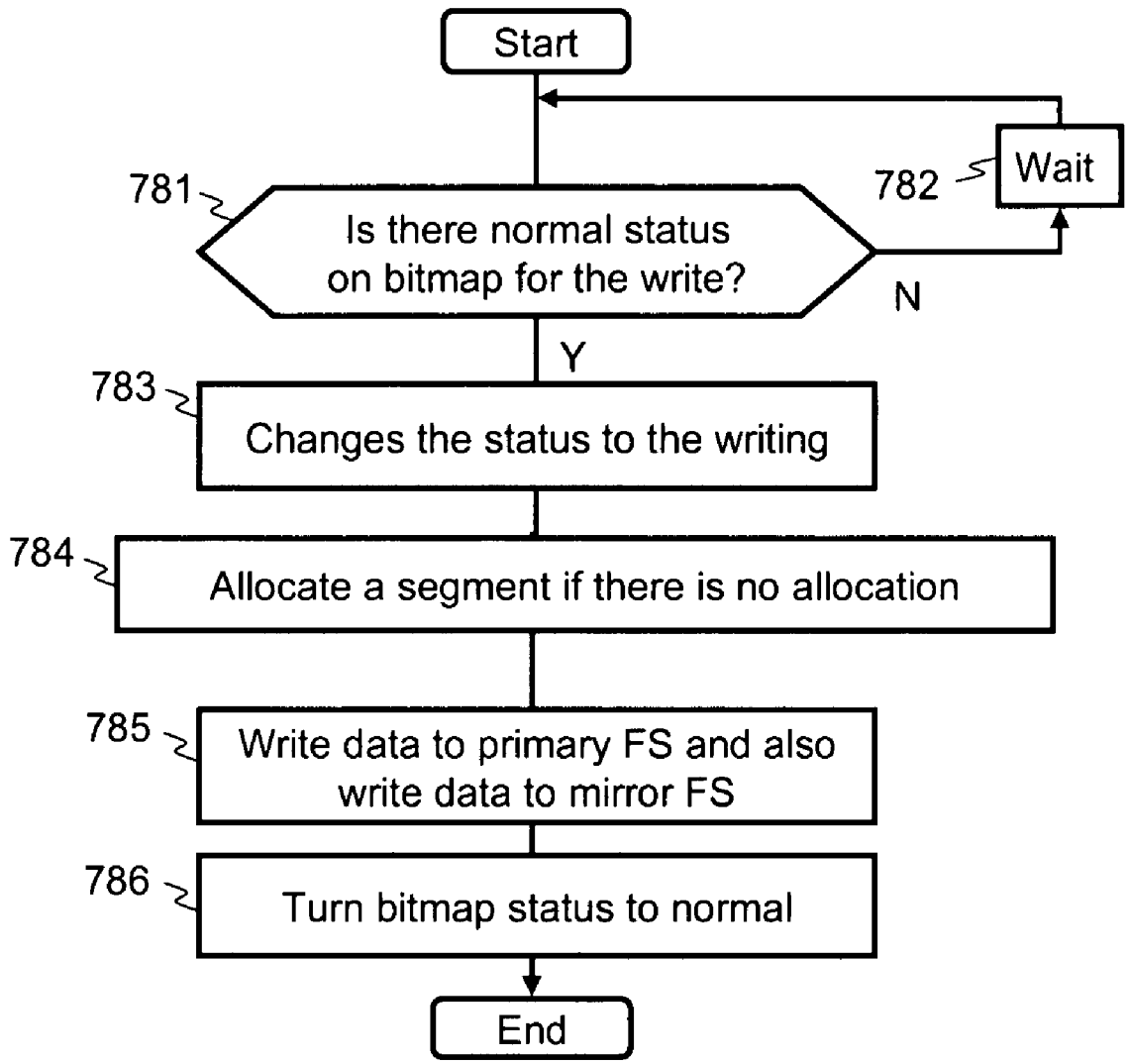
FIG. 27 illustrates a process of a write operation during the resync operation.

During the resync operation, normal write operations need to be considered that take place during the resync operation. FIG. 27 illustrates the procedure that may be used, which is similar to that set forth in FIG. 12 of the first embodiment.

Step 781: The file system checks whether the status of the segments that include the write operation's access region from a starting address to the addition of the size of the write data on bitmap table 380 is "normal" or not. If yes, the procedure goes to Step 183. If any segment within the region is not normal, the procedure goes to Step 182.

Step 782: File system waits for short period time, such as a few minutes, and returns to Step 781.

Step 783: File system changes the status for the segment on bitmap table 380 from "normal" to "writing".

Step 784: File system allocates a free segment to the current copy point for the segment of the file system in the secondary file system from the free segment pool in the file system if there is not already a segment allocate. The current copy point for the segment is calculated by current copy point 383 times segment size 382.

Step 785: File system writes data to the segment of the file in the primary file system. If the segment keeps data as a fragment within the segment, the file system reads the segment, modifies the data on the read data and writes the modified data into the file on primary file system. The write data is also stored by mirror manager on the corresponding secondary file system which is specified by the mirror manager pair table 370.

Step 786: File system changes the status for the segment on bitmap table from "writing" to "normal", and the procedure ends.

To resync data from a secondary file system to a primary file system, the administrator needs to execute a reverse resync, which is the same as the ordinary resync operation described above for FIG. 25, except that the direction of mirroring (updating) is reversed.

Split with De-Duplication

Figure 28:
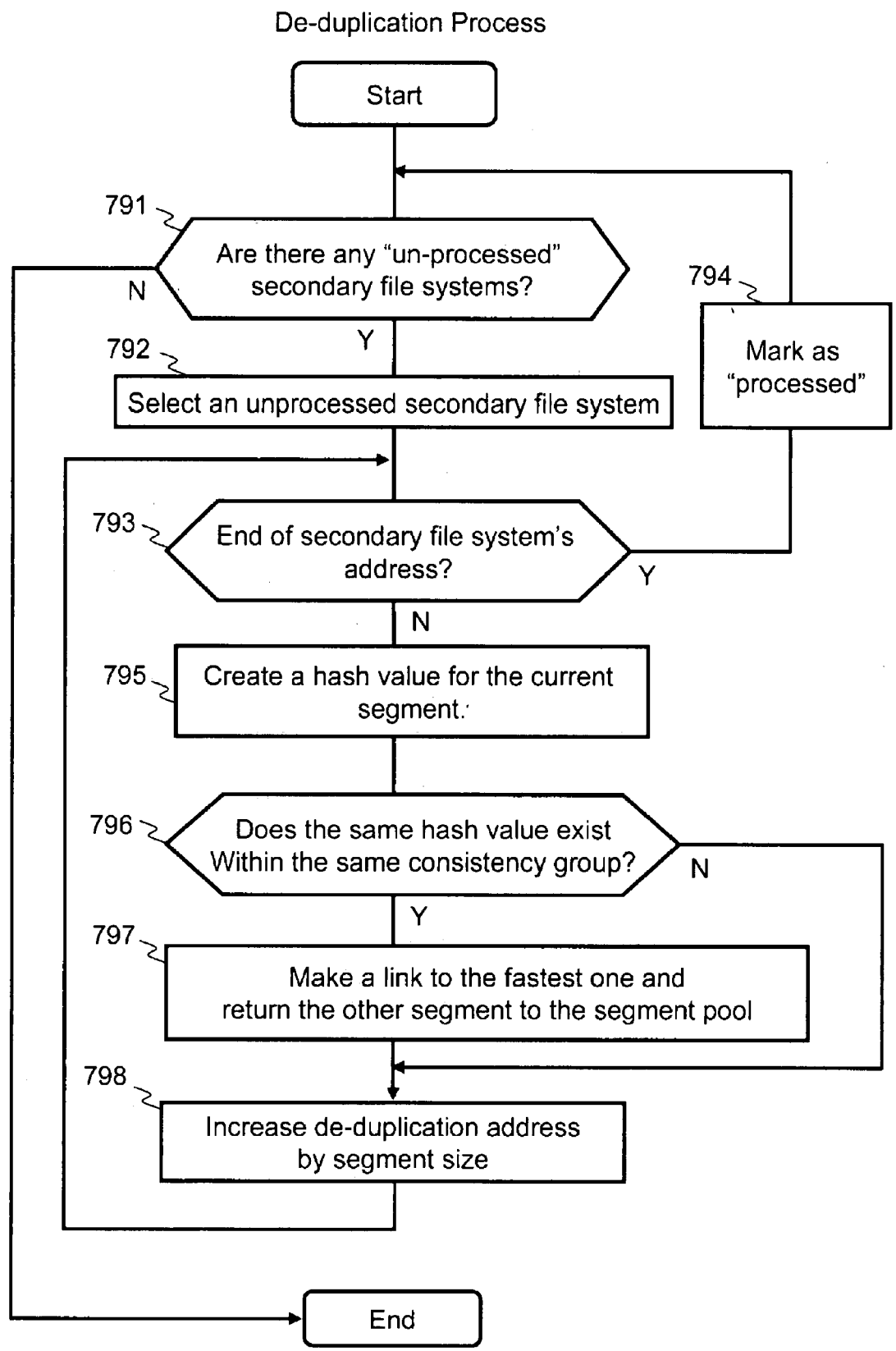
FIG. 28 illustrates details of the de-duplication process in a NAS.

The processing of a point-in-time copy of data from a primary file system and considering de-duplication is similar to that carried out for the first embodiment, and as described above in FIG. 1 and FIG. 13 and the restore process described above in FIG. 2. In the present embodiment, the object of mirroring is changed from a volume to a file system. Considering of this point, details of the de-duplication process are set forth in FIG. 28, and includes steps 791-798, as set forth below.

Step 791: Mirror manager checks whether there are any "un-processed" secondary file systems based on the status information 377 in FIG. 23. If there is one or more un-processed secondary file system, the procedure goes to Step 792. If there is not, the procedure ends.

Step 792: Mirror manager selects for de-duplication an "un-processed" secondary file system from the consistency group by referring to the status information 377 in pair table 370, changes the state to "processing", and resets the current de-duplication address to "0".

Step 793: Mirror manager checks if the current de-duplication address is outside the file size on the primary file system. If it is, then de-duplication of the file is complete and the procedure goes to Step 794. If it is not, then procedure goes to Step 795.

Step 794: Mirror manager marks as "processed" in the status information 378 for the secondary file system, and the procedure returns to Step 791.

Step 795: Mirror manager calculates a hash code value for the data contained within the current segment if the segment number 355 is allocated; a dash (—) indicates "unallocated", i.e., no segment is allocated for that address. For creation of the hash code value to uniquely identify data, the procedure may use MD5 hash algorithm with check sum for segment data, SH-1 algorithm with check sum for segment data, or other suitable hash algorithm. Mirror manager enters the hash information in column 356 for the corresponding segment.

Step 796: Mirror manager checks if there is a matching hash value within the consistency group. If there is, the procedure goes to Step 797. If there is not, the procedure skips to Step 798.

Step 797: Mirror manager make a link from found segment which has same data to current segment being checked. Mirror manager stores the segment number on the segment number information 355 and turns on the link status 357 as yes (linked).

Step 798: Mirror manager increases the current de-duplication address by the size of the current segment, and the procedure returns to Step 793.

Figure 2:
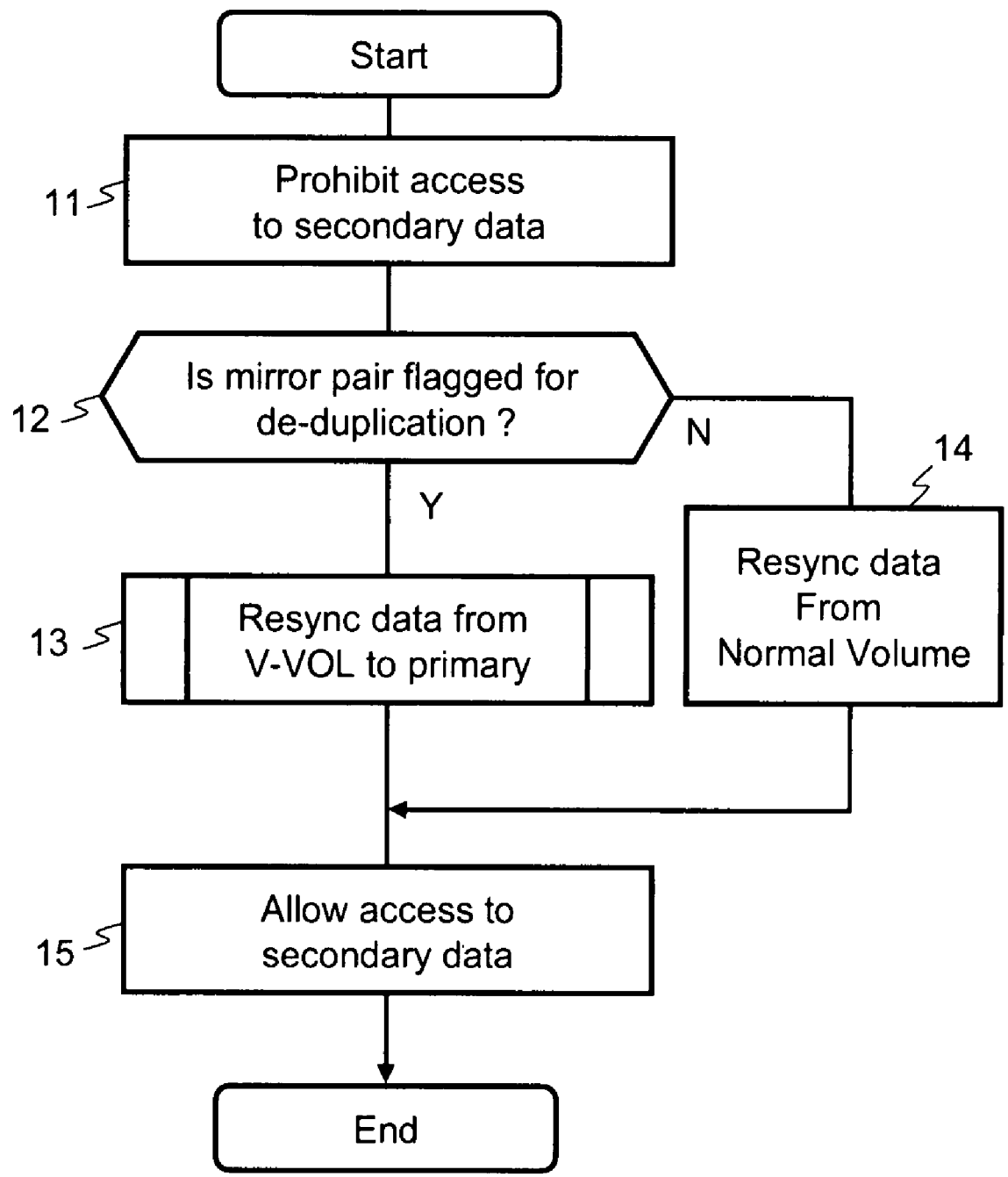
FIG. 2 illustrates a reverse resynchronize and split operation according to the invention.

Regarding restoration of data to the primary file system, the process set forth in FIG. 2 may be followed, taking into consideration that the process is carried out for file systems in a NAS system rather than for volumes in a block-based storage system.

Step 11: Mirror manager prohibits accessing for the secondary file system by changing the access mode 362 in export table 360 of FIG. 22 to "Deny" or "Read-Only".

Step 12: Mirror manager checks the de-duplication flag 378 for consistency group in pair table 370 of FIG. 23. If the de-duplication flag indicates that the consistency group is subject to de-duplication operations, the procedure goes to Step 13. On the other hand, if the flag is not set for de-duplication, the procedure goes to Step 14.

Step 13: Mirror manager resynchronizes data from the secondary file system (which has been previously de-duplicated) to the corresponding primary file system. In the case of a read of the secondary file system to the primary file system, the mirror manager uses the read access operations from Step 1201 to Step 1208 set forth in FIG. 29, which are similar to steps 201-208 of FIG. 14 described above.

Step 14: Mirror manager resynchronizes data from a normal file system to the primary file system, since the secondary file system was not de-duplicated.

Step 15: Mirror manager allows access to the secondary file system again for accepting all I/O operations by changing the setting in column 362 of export table 36 of FIG. 22, and the procedure ends.

Read/Write De-Duplication File System

Figure 29:
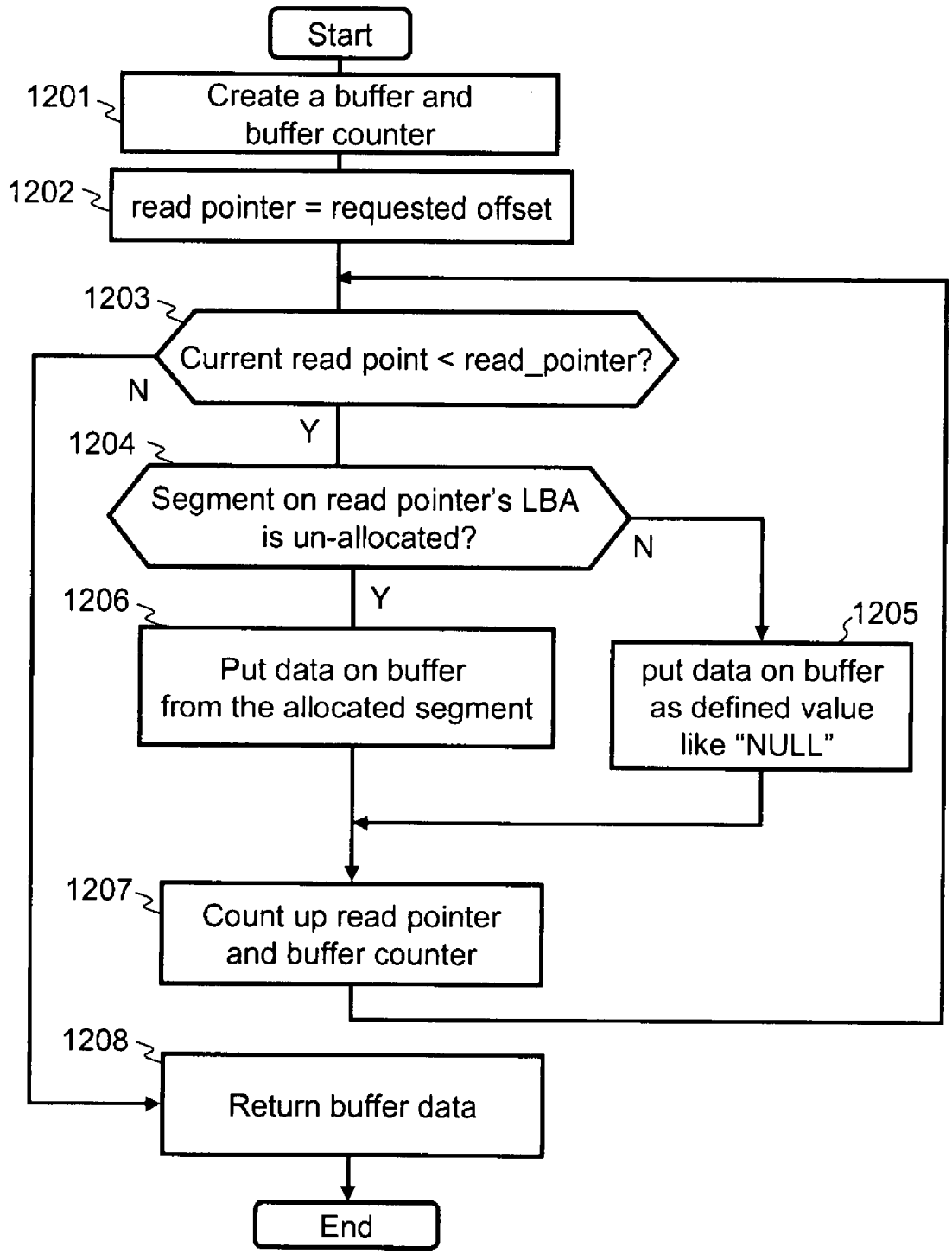
FIG. 29 illustrates the process in a secondary file system for a read operation after split.

After the split of the secondary file system, a user may want to access the data in the secondary file system. Read/write operations on the de-duplicated file system are different from normal read/write operations for a normal (non-de-duplicated) file system. In a read operation based on NFS/CIFS or mirror manager, file systems return normal data if the file system has not been de-duplicated on a segment specified by address in the read request. However, when the segment has a "yes" linked status 357 that indicates that segment is linked to a duplicate segment, then the operations of FIG. 29 are necessary, ad described below.

Step 1201: File system manger creates a buffer, the size of which is defined by mirror manager or "count" in NFS instead of Transfer_Length in SCSI, and prepares a buffer_counter to write data on the buffer from the de-duplicated file system. The buffer_counter is initially set to "zero".

Step 1202: File system manager prepares a read_pointer to indicate the current read point on a file and resets the value 372 "segment size" as requested offset, which in the case of mirror manager is the "offset" in NFS.

Step 1203: File system manager checks whether the current read point is under the read_pointer. If it is, this procedure goes to Step 1204. If it is not, then all data has been read, and the procedure goes to Step 1208.

Step 1204: File system checks if a segment specified by read_pointer LBA is allocated. If the segment has is allocated, the procedure goes to Step 1206. If the segment is not allocated, the procedure goes to Step 1205.

Step 1205: File system writes null data or user/system-defined characters onto the buffer from buffer_counter to buffer_counter plus size of the read within the segment.

Step 1206: File system reads data on a segment specified by segment number 355 from LBA which is specified by read_pointer to end of the segment which is specified by the block address 354 plus segment size 358, and then puts the data on the buffer from buffer_counter to size of the read data.

Step 1207: File system increases the buffer counter by the size of the written data on the buffer, and increases the read_pointer by the size of the data read from the segment.

Step 1208: File system manager returns the data in the buffer to mirror manager or as a NFS read return, and the procedure ends. In the case of CIFS, the behavior is same except for the names of the parameters for "count" and "offset". Further, deletion of a pair or consistency group in this embodiment is carried out using the same operation as described above in the first embodiment.

Embodiment 8

Remote Mirror in a NAS System

Figure 30:
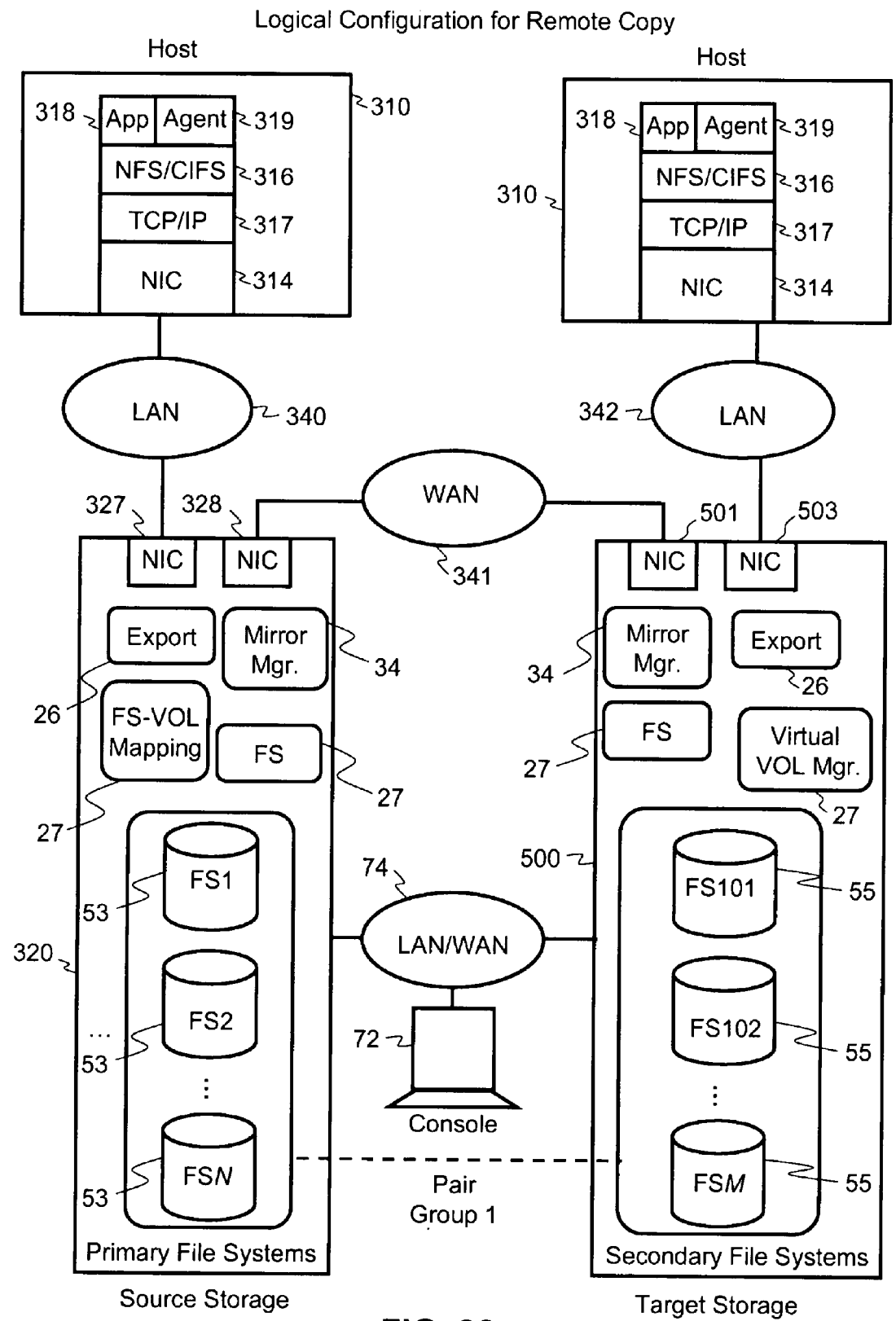
FIG. 30 illustrates a physical and logical configuration of an eighth embodiment of the invention.

FIG. 30 illustrates the physical & logical configuration of an eighth embodiment of the invention. In the physical configuration, the seventh embodiment of FIG. 20 is incorporated as a first NAS system 320 in communication with a host computer 310 via a LAN 340, as described above. A secondary NAS 500 is included in this embodiment for receiving remote mirroring, and a second host computer 310 which is connected to secondary NAS 500 via a LAN 342 and a NIC 503. The secondary NAS 500 may be of the same configuration as primary NAS 320, and NAS 320 includes a NIC 328 able to communicate with a NIC 501 on secondary NAS 500 via wide area network (WAN) 341. WAN 341 may be an IP reachable network switch or router, such as a generic Fibre Channel (FC) switch, Ethernet switch, Ethernet hub, or Internet Protocol (IP) router. Also a management console 72 may be connected to NAS systems 320, 500 via a LAN or WAN 74, which may be the same as WAN 341, or separate.

In the logical configuration of this embodiment, rather than having a local mirror replication, data is mirrored between primary file systems 53 on NAS 320 and secondary file systems 55 on NAS 500. Thus, mirror manager pair table 370 will have difference serial numbers entered in columns 373 and 375. Based on this information, the NAS systems 320, 500 are able to communicate with each other for transmitting data. Thus, the secondary file systems 55 are located in secondary NAS 500 in this embodiment, but other basic capabilities and operations under the invention are the same as described above for the seventh embodiment.

Thus, it may be seen that the invention provides a general purpose mirroring environment for purposes of backup, data archiving, and disaster recovery, while reducing the amount of storage space required for supporting the mirroring environment. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method of operating an information system, comprising:
    storing data to a first volume and mirroring the data to a second volume, said second volume being a virtual volume having a plurality of logical storage addresses, wherein a segment of physical storage capacity is allocated for a specified logical address as required when the data is to be stored to said specified logical address;
    selecting segments of the second volume during a de-duplication operation on the second volume;
    calculating a hash value for a particular segment representative of data contained in the particular segment;
    comparing the calculated hash value with previously-stored hash values for other segments in the second volume;
    linking the particular segment to another segment having a previously-stored hash value that matches the calculated hash value of the particular segment;
    releasing the particular segment from the second volume when another segment has a previously-stored hash value that matches the calculated hash value of the particular segment, whereby physical storage capacity required for the second volume is reduced;
    resynchronizing the data stored on said second volume with the data stored on said first volume;
    splitting said second volume from mirroring said first volume prior to said step of selecting segments of the second volume during the de-duplication operation on the second volume; and
    reverse synchronizing the data stored on said first volume with data stored on said second volume, wherein before reverse synchronizing whether the second volume has been de-duplicated or not is checked and if the second volume has been de-duplicated, said reverse synchronizing is conducted on to the first volume from the de-duplicated volume.

2. A method according to claim 1, further including steps of
    providing a first storage system in communication with a host computer, said first storage system including a first controller and multiple first disk devices, said first volume representing physical storage capacity on said first disk devices; and
    providing said second volume on said first storage system as a local mirror of said first volume.

3. A method according to claim 1, further including steps of
    providing a first storage system in communication with a host computer, said first storage system including a first controller and multiple first disk devices, said first volume representing physical storage capacity on said first disk devices;
    providing a second storage system in communication with said first storage system and in a location separate from said first storage system, said second storage system including a second controller and multiple second disk devices;
    providing said second volume on said second storage system as a remote mirror of said first volume; and
    checking whether the second volume has been designated for de-duplication operations before said selecting segments of the second volume,
    wherein said de-duplication operation on the second volume is performed after pair configuration of the second volume to the first volume is suspended and determined that the second volume has been designated for de-duplication operations based on an information maintained in a memory of said information system.

4. A method according to claim 3, further including steps of
    providing a plurality of said first volumes and a plurality of said second volumes for forming a consistency group in which each first volume is mirrored to one of said second volumes;
    wherein said step of comparing the calculated hash value with previously-stored hash values for other segments in the virtual volume includes comparing the calculated hash value with previously-stored hash values for segments of all said second volumes in the consistency group, and
    wherein second volumes in the same consistency group have the same status on whether the second volume has been designated for de-duplication operations, and said status indicated by a flag in said memory.

5. A method according to claim 1, further including steps of
    providing said first volume and said second volume on a network attached storage system; and
    creating a first file system on said first volume and a second file system on said second volume, said second file system being a copy of said first file system, such that said second file system mirrors said first file system prior to said de-duplication operation.

6. A method according to claim 1, further including a step of
    providing a first virtualization apparatus for presenting the first volume and the second volume to a host computer, said first virtualization apparatus being in communication with a first storage system, said first storage system including a first controller for communicating with said first virtualization apparatus and a plurality of disk devices for providing physical storage space for said first volume and said second volume.

7. A method according to claim 1, further including a step of
    providing a first virtualization apparatus for presenting the first volume to a host computer, said first virtualization apparatus being in communication with a first storage system, said first storage system including a first controller for communicating with said first virtualization apparatus and a plurality of first disk devices for providing physical storage space for said first volume; and
    providing a second virtualization apparatus for presenting the second volume to a host computer, said second virtualization apparatus being in communication with a second storage system, said second storage system including a second controller for communicating with said second virtualization apparatus and a plurality of second disk devices for providing physical storage space for said second volume.

8. A method according to claim 1, further including a step of
reading requested data from said second volume following the de-duplication operation by:
identifying a requested logical block address;
determining a segment of said second volume corresponding to the identified logical block address; and
when the segment corresponding to the logical block address is linked to another segment, reading the requested data from the linked other segment.

9. A method according to claim 1, wherein a portion of the mirror data stored in the second volume is not selected for the de-duplication operation.

10. An information system, comprising:
a first storage system including a first controller and a plurality of storage devices, said first controller configured to present physical storage space on said storage devices as volumes for storage of data;
a first host computer able to communicate with said first storage system via a network; and
a second storage system in communication with said first storage system, said second storage system including a second controller and a plurality of second disk devices, said second storage system presenting said second volume as said virtual volume and being configured to carry out said de-duplication operation;
wherein said first storage system is configured to store write data received from said computer to a first volume on said first storage system and mirror the write data to a second volume, said second volume being a virtual volume having a plurality of logical addresses, wherein segments of physical storage capacity are allocated for a logical address as required when the write data is stored to said logical address;
wherein said second volume is de-duplicated by selecting segments of the second volume during a de-duplication operation and a hash value is calculated for a particular segment representative of data contained in the particular segment;
wherein said calculated hash value is compared with previously-stored hash values for other segments in the second volume, and the particular segment is linked to another segment having a previously-stored hash value that matches the calculated hash value of the particular segment,
wherein the particular segment is released from the second volume when another segment has a previously-stored hash value that matches the calculated hash value of the particular segment, whereby physical storage capacity required for the second volume is reduced;
wherein before said selecting segments of the second volume whether the second volume has been designated for de-duplication operations is checked, and
wherein said de-duplication operation on the second volume is performed after pair configuration of the second volume to the first volume is suspended and determined that the second volume has been designated for de-duplication operations based on an information maintained in a memory of said information system.

11. The system according to claim 10, further comprising:
a first virtualization apparatus for presenting the first volume and the second volume to the first host computer, said virtualization apparatus being in communication with the first storage system and the first host computer, wherein said first volume and said second volume are virtual volumes that map to corresponding volumes on said first storage system.

12. The system according to claim 10, further comprising:
a first virtualization apparatus for presenting the first volume to the first host computer, said first virtualization apparatus being in communication with the first storage system and the first host computer, wherein said first volume is a first virtual volume that maps to a corresponding logical volume on said first storage system;
a second virtualization apparatus for presenting the second volume to a second host computer, said second virtualization apparatus being in communication with the second storage system and the second host computer.

13. The system according to claim 10, further comprising:
an intelligent switch for presenting the first volume and the second volume to a host computer, said intelligent switch being in communication with the first storage system and the host computer, wherein said first volume and said second volume are virtual volumes that map to corresponding volumes on said first storage system.

14. The system according to claim 10, further comprising:
said first storage system being a network attached storage system, wherein a first file system is created on said first volume and a second file system is created on said second volume, said second file system being a copy of said first file system, such that said second file system mirrors said first file system prior to said de-duplication operation on the second volume.

15. The system according to claim 10, further comprising:
said first storage system being a first network attached storage system, wherein a first file system is created on said first volume; and
said second storage system being a second network attached storage system, wherein a second file system is created on said second volume, said second file system being a copy of said first file system, such that said second file system mirrors said first file system prior to said de-duplication operation on the second volume.

16. A method of reducing an amount of storage capacity used during mirroring operations, comprising:
storing data to a first volume and mirroring the data to a second volume, said second volume being a virtual volume having a plurality of logical addresses, wherein segments of physical storage capacity are allocated for a specified logical address as required when the data is to be stored to said specified logical address; and
carrying out a de-duplication operation on the second volume following a split from the first volume by identifying a particular segment of said second volume having data that is the same as another segment; creating a link from the particular segment to the other segment; and releasing the particular segment from the second volume, whereby physical storage capacity required for the second volume is reduced;
resynchronizing the data stored on said second volume with the data stored on said first volume prior to splitting said second volume from mirroring said first volume; and
reverse resynchronizing the data stored on said first volume with data stored on said second volume, wherein before reverse resynchronizing whether the second volume has been de-duplicated or not is checked and if the second volume has been de-duplicated, said reverse resynchronizing is conducted on to the first volume from the de-duplicated volume.

17. A method according to claim 16, further including steps of selecting segments of the second volume during the de-duplication operation on the second volume;

calculating a hash value for the particular segment representative of the data contained in the particular segment;

comparing the calculated hash value with previously-stored hash values for other segments in the second volume;

linking the particular segment to the another segment having a previously-stored hash value that matches the calculated hash value of the particular segment; and releasing the particular segment from the second volume when the other segment has a previously-stored hash value that matches the calculated hash value of the particular segment.

18. A method according to claim 16, further including steps of providing a first storage system in communication with a host computer, said first storage system including a first controller and multiple first disk devices, said first volume representing physical storage area on said disk devices; and providing a second storage system in communication with said first storage system and in a location separate from said first storage system, said second storage system including a second controller and multiple second disk devices; and providing said second volume on said second storage system as a remote mirror of said first volume.

19. A method of operating an information system, comprising:

storing data to a first volume and mirroring the data to a second volume, said second volume being a virtual volume having a plurality of logical storage addresses, wherein a segment of physical storage capacity is allocated for a specified logical address as required when the data is to be stored to said specified logical address;

selecting segments of the second volume during a de-duplication operation on the second volume;

calculating a hash value for a particular segment representative of data contained in the particular segment;

comparing the calculated hash value with previously-stored hash values for other segments in the second volume;

linking the particular segment to another segment having a previously-stored hash value that matches the calculated hash value of the particular segment;

releasing the particular segment from the second volume when another segment has a previously-stored hash value that matches the calculated hash value of the particular segment, whereby physical storage capacity required for the second volume is reduced;

providing a first storage system in communication with a host computer, said first storage system including a first controller and multiple first disk devices, said first volume representing physical storage capacity on said first disk devices;

providing a second storage system in communication with said first storage system and in a location separate from said first storage system, said second storage system including a second controller and multiple second disk devices;

providing said second volume on said second storage system as a remote mirror of said first volume; and checking whether the second volume has been designated for de-duplication operations before said selecting segments of the second volume, wherein said de-duplication operation on the second volume is performed after pair configuration of the second volume to the first volume is suspended and determined that the second volume has been designated for de-duplication operations based on an information maintained in a memory of said information system.

20. A method according to claim 19, further comprising:

providing a plurality of said first volumes and a plurality of said second volumes for forming a consistency group in which each first volume is mirrored to one of said second volumes;

wherein said step of comparing the calculated hash value with previously-stored hash values for other segments in the virtual volume includes comparing the calculated hash value with previously-stored hash values for segments of all said second volumes in the consistency group; and wherein second volumes in the same consistency group have the same status on whether the second volume has been designated for de-duplication operations, and said status indicated by a flag in said memory.

* * * * *